United States Patent
Xiao et al.

(10) Patent No.: US 12,497,463 B2
(45) Date of Patent: Dec. 16, 2025

(54) ANTI-CD38 ANTIBODY AND USE THEREOF

(71) Applicant: JIANGSU KANION PHARMACEUTICAL CO., LTD., Jiangsu (CN)

(72) Inventors: Wei Xiao, Jiangsu (CN); Aizhi Zhao, Wallingford, PA (US); Yueheng Han, Wallingford, PA (US); Zhenzhong Wang, Jiangsu (CN); Chenfeng Zhang, Jiangsu (CN); Liang Cao, Jiangsu (CN); Jianming Zhou, Jiangsu (CN); Liang Li, Jiangsu (CN)

(73) Assignee: JIANGSU KANION PHARMACEUTICAL CO., LTD., Jiangsu (CN)

( * ) Notice: Subject to any disclaimer, the term of this patent is extended or adjusted under 35 U.S.C. 154(b) by 550 days.

(21) Appl. No.: 18/010,853

(22) PCT Filed: Jun. 22, 2021

(86) PCT No.: PCT/CN2021/101408
§ 371 (c)(1),
(2) Date: Dec. 16, 2022

(87) PCT Pub. No.: WO2021/259227
PCT Pub. Date: Dec. 30, 2021

(65) Prior Publication Data
US 2024/0228648 A1 Jul. 11, 2024

Related U.S. Application Data

(60) Provisional application No. 63/042,773, filed on Jun. 23, 2020.

(51) Int. Cl.
*C07K 16/28* (2006.01)
*A61K 47/68* (2017.01)
*A61K 49/00* (2006.01)
*A61K 51/10* (2006.01)
*A61P 35/00* (2006.01)

(52) U.S. Cl.
CPC ...... *C07K 16/2896* (2013.01); *A61K 47/6849* (2017.08); *A61K 49/0058* (2013.01); *A61K 51/1027* (2013.01); *A61P 35/00* (2018.01); *C07K 2317/24* (2013.01); *C07K 2317/31* (2013.01)

(58) Field of Classification Search
CPC ........... C07K 16/2896; C07K 2317/24; C07K 2317/31; C07K 2317/21; C07K 2317/41; C07K 2317/622; C07K 2317/732; C07K 2317/734; C07K 2317/76; C07K 2317/92; A61K 47/6849; A61K 49/0058; A61K 51/1027; A61K 2039/505; A61K 2039/545; A61K 39/39558; A61K 2121/00; A61K 2300/00; A61K 40/4222; A61K 47/6803; A61P 35/00; A61P 37/00; C12N 15/81; C12N 15/1037; C12N 15/63; C40B 40/08
See application file for complete search history.

(56) References Cited

U.S. PATENT DOCUMENTS

| | | |
|---|---|---|
| 2003/0211553 A1 | 11/2003 | Logtenberg et al. |
| 2009/0148449 A1 | 6/2009 | De Weers et al. |
| 2015/0118251 A1 | 4/2015 | Deslandes et al. |
| 2015/0246975 A1 | 9/2015 | Doshi |
| 2016/0222106 A1 | 8/2016 | Doshi et al. |
| 2017/0190781 A1 | 7/2017 | Mills et al. |
| 2019/0284294 A1 | 9/2019 | Deslandes et al. |
| 2020/0190209 A1 | 6/2020 | Merchiers et al. |

FOREIGN PATENT DOCUMENTS

| | | |
|---|---|---|
| CN | 106103481 | 11/2016 |
| CN | 106456731 | 2/2017 |
| CN | 107033243 | 8/2017 |
| CN | 107406506 | 11/2017 |
| WO | WO 2015/152430 | 10/2015 |
| WO | WO 2018/224682 | 12/2018 |

OTHER PUBLICATIONS

Extended European Search Report issued in counterpart European Application No. 21829466.8 mailed Jul. 23, 2024.
Office Action issued in counterpart Japanese Patent Application No. 2022-579884 mailed Jun. 11, 2024 (English translation provided).
Tsumoto, Kouhei. "Dissection of antibody-antigen interactions for development of antibodies", *Drug Delivery System*, May 28, 2013, pp. 412-423 (English Abstract provided).
Office Action issued in counterpart Japanese Patent Application No. 2022-579884, dated Oct. 3, 2023 (English machine translation provided).
International Search Report and Written Opinion issues in Corresponding PCT Application No. PCT/CN2021/101408, dated Oct. 11, 2021.

*Primary Examiner* — Robert S Cabral
(74) *Attorney, Agent, or Firm* — Norton Rose Fulbright US LLP

(57) ABSTRACT

Provided are a composition containing a CD38 antibody or a fragment thereof, and a use of the composition in treating diseases associated with CD38 expression.

26 Claims, 6 Drawing Sheets
Specification includes a Sequence Listing.

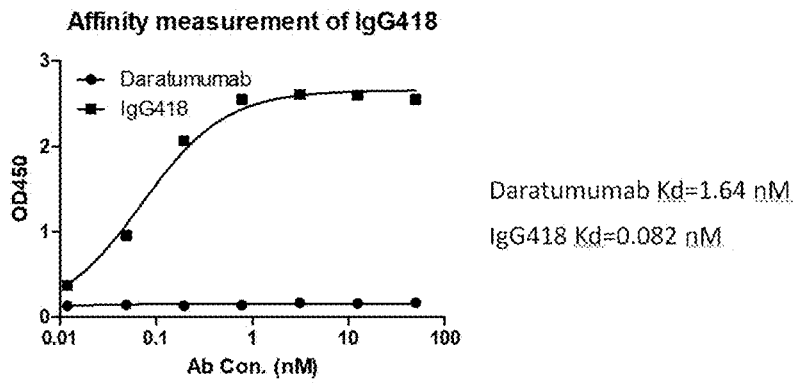
Figure 1
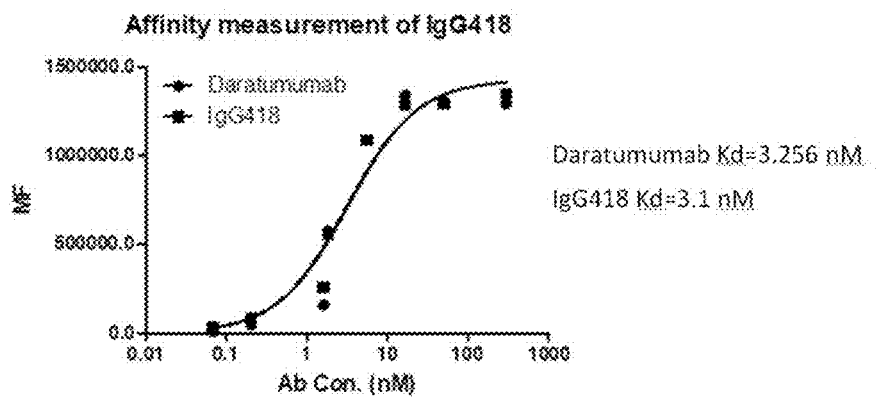
Figure 2
ELISA
| Sample | OD450 |
|---|---|
| IgG418+CD38 | 2.570 |
| IgG418+CD38 | 2.507 |
| Darzalex+CD38 | 0.168 |
| Darzalex+CD38 | 0.176 |
| CD38 only | 0.377 |
| CD38 only | 0.385 |
Figure 3

ANTI-CD38 ANTIBODY AND USE THEREOF

CROSS-REFERENCE TO RELATED APPLICATIONS

This application is a national phase application under 35 U.S.C. § 371 of International Application No. PCT/CN2021/101408 filed 22 Jun. 2021, which claims priority to U.S. Provisional Application No. 63/042,773 filed 23 Jun. 2020. The entire contents of each of the above-referenced disclosures is specifically incorporated by reference herein without disclaimer.

BACKGROUND OF THE INVENTION

CD38, also known as cyclic ADP ribose hydrolase, is a type II transmembrane glycoprotein with a long C-terminal extracellular domain and a short N-terminal cytoplasmic domain. CD38 is a member of a group of related membrane bound or soluble enzymes, comprising CD 157 and Aplysia ADPR cyclase. This family of enzymes has the unique capacity to convert NAD to cyclic ADP ribose or nictotinic acid-adenine dinucleotide phosphate.

In addition, CD38 has been reported to be involved in Ca2+ mobilization and in the signal transduction through tyrosine phosphorylation of numerous signaling molecules, including phospholipase Cy, ZAP-70, syk, and c-cbl. Based on these observations, CD38 was proposed to be an important signaling molecule in the maturation and activation of lymphoid cells during their normal development.

Among hematopoietic cells, an assortment of functional effects have been ascribed to CD38 mediated signalling, including lymphocyte proliferation, cytokine release, regulation of B and myeloid cell development and survival, and induction of dendritic cell maturation.

Yet, the exact role of CD38 in signal transduction and hematopoiesis remains unclear, since most of the signal transduction studies have used cell lines ectopically over-expressing CD38 and anti-CD38 monoclonal antibodies, which are non-physiological ligands.

The presumed natural ligand of CD38 is CD31 (PECAM-1; Platelet Endothelial Cell Adhesion Molecule-1). CD31 is a 130 kD member of the immunoglobulin superfamily which is expressed on the surface of circulating platelets, neutrophils, monocytes, and naïve B-lymphocytes.

Functionally, CD31 is thought to act as an adhesion molecule. It has been suggested that the interaction of CD38 with CD31 may act in promoting survival of leukemia cells.

Animal models deficient for a single molecule have in many instances been fundamental tools for understanding the biological role of the molecule in the animal. The underlying assumption is that if the protein exerts a non-redundant function, then its complete lack will result in the complete loss of that function.

CD38 knockout mice have been generated. These animals show an almost complete loss of tissue associated NADase activity. Yet, these animals are viable, leading to the conclusion that CD38 and its activities are not necessary for life. These mice do however exhibit a defect in their innate immunity and a reduced T-cell dependent humoral response.

In contrast to the results in mice, in humans there is strong circumstantial evidence that the absence of CD38 is incompatible with life. Analysis of more than 5,000 blood samples from newborns failed to identify a single CD38− individual; suggesting that unlike mice, CD38 is necessary for survival. Thus, it is not clear that the observations made in mice concerning CD38 function can be extrapolated to humans.

CD38 is upregulated in many hematopoeitic malignancies and in cell lines derived from various hematopoietic malignancies including non-Hodgkin's lymphoma (NHL), Burkitt's lymphoma (BL), multiple myeloma (MM), B chronic lymphocytic leukemia (B-CLL), B and T acute lymphocytic leukemia (ALL), T cell lymphoma (TCL), acute myeloid leukemia (AML), hairy cell leukemia (HCL), Hodgkin's Lymphoma (HL), and chronic myeloid leukemia (CML). On the other hand, most primitive pluripotent stem cells of the hematopoietic system are CD38− (FIG. 1).

In spite of the recent progress in the discovery and development of anti-cancer agents, many forms of cancer involving CD38-expressing tumors still have a poor prognosis. Thus, there is a need for improved methods for treating such forms of cancer.

SUMMARY OF THE INVENTION

Provided herein are reagents and methods for binding to CD38 and methods, for treating CD38 associated diseases and detecting CD38 using CD38-specific binding agents including antibodies specific for CD38.

Accordingly, in some embodiments, an isolated antibody or antibody fragment thereof specific for human CD38 (SEQ ID NO: 1) is described. This antibody or antibody fragment thereof is composed of a heavy chain variable region and a light chain variable region, wherein the heavy chain variable region is composed of three complementary determining regions (CDRs), HCDR1, HCDR2, and HCDR3, and wherein the light chain variable region is also composed of three CDRs, LCDR1, LCDR2, and LCDR3. The sequences of the CDRs are represented by: HCDR1 (SEQ ID NO: 9), HCDR2 (SEQ ID NO: 13), HCDR3 (SEQ ID NO: 17), LCDR1 (SEQ ID NO: 25), LCDR2 (SEQ ID NO: 29) and LCDR3 (SEQ ID NO: 33).

In other embodiments, the isolated antibody or antibody fragment thereof is composed of a heavy chain variable region, wherein the sequence of heavy chain variable region is encompassed by SEQ ID NO: 5. In other embodiments, the isolated antibody or antibody fragment thereof is composed of a light chain variable region, wherein the sequence of the light chain variable region is encompassed by SEQ ID NO: 21.

In some embodiments, the isolated antibody or antibody fragment thereof is composed of a heavy chain variable region, wherein the sequence of heavy chain variable region is encompassed by SEQ ID NO: 5. In other embodiments, the isolated antibody or antibody fragment thereof is composed of a light chain variable region, wherein the sequence of the light chain variable region is encompassed by SEQ ID NO: 21. This combination of heavy chain variable region and light chain variable region is referred to as scFv418.

In some embodiments, the isolated antibody or antibody fragment thereof includes an Fc domain. In other embodiments, the Fc domain is a human Fc domain. In still other embodiments, the Fc domain is a variant Fc domain.

In some embodiments, an isolated nucleic acid encoding the heavy chain of SEQ ID NO: 37 is provided. In other embodiments, an isolated nucleic acid encoding the light chain of SEQ ID NO: 41 is provided.

In some embodiments, a host cell is provided, the host cell containing the isolated nucleic acid encoding the heavy chain of SEQ ID NO: 5 and the isolated nucleic acid encoding the light chain of SEQ ID NO: 21.

In some embodiments, a host cell is provided, the host cell containing the isolated nucleic acid encoding the heavy chain of SEQ ID NO: 37 and the isolated nucleic acid encoding the light chain of SEQ ID NO: 41.

In some embodiments, a method of producing the antibody of the invention is provided. The method encompassing culturing a host cell containing the isolated nucleic acid encoding the heavy chain of SEQ ID NO: 5 and the isolated nucleic acid encoding the light chain of SEQ ID NO: 21 under conditions wherein the isolated nucleic acid(s) are expressed and an antibody is produced.

In some embodiments, a method of producing the antibody of the invention is provided. The method encompassing culturing a host cell containing the isolated nucleic acid encoding the heavy chain of SEQ ID NO: 37 and the isolated nucleic acid encoding the light chain of SEQ ID NO: 41 under conditions wherein the isolated nucleic acid(s) are expressed and an antibody is produced.

In some embodiments, an isolated antibody specific for human CD38 (SEQ ID NO: 1) is described. This antibody is composed of six CDRs, wherein each CDR of this antibody can differ from SEQ ID NO: 9, SEQ ID NO: 13, SEQ ID NO: 17, SEQ ID NO: 25, SEQ ID NO: 29, and SEQ ID NO: 33 by 0, 1, or 2 amino acid substitutions.

In other embodiments, the isolated antibody is composed of a heavy chain variable region, wherein the sequence of heavy chain variable region is encompassed by SEQ ID NO: 5. In other embodiments, the isolated antibody is composed of a light chain variable region, wherein the sequence of the light chain variable region is encompassed by SEQ NO:21. This combination of heavy chain variable region and light chain variable region is referred to as scFv418.

In some embodiments, an isolated nucleic acid encoding the heavy chain of SEQ ID NO: 37 is provided. In other embodiments, an isolated nucleic acid encoding the light chain of SEQ ID NO: 22 is provided. This combination of heavy chain and light chain is referred to as IgG418 full antibody.

In some embodiments, a host cell is provided, the host cell containing the isolated nucleic acid encoding the heavy chain of SEQ ID NO: 5 and the isolated nucleic acid encoding the light chain of SEQ ID NO: 21.

In some embodiments, a host cell is provided, the host cell containing the isolated nucleic acid encoding the heavy chain of SEQ ID NO: 37 and the isolated nucleic acid encoding the light chain of SEQ ID NO: 41.

In some embodiments, a method of producing the antibody of the invention is provided. The method encompassing culturing a host cell containing the isolated nucleic acid encoding the heavy chain of SEQ ID NO: 5 and the isolated nucleic acid encoding the light chain of SEQ ID NO: 21 under conditions wherein the isolated nucleic acid(s) are expressed and an antibody is produced.

In some embodiments, a method of producing the antibody of the invention is provided. The method encompassing culturing a host cell containing the isolated nucleic acid encoding the heavy chain of SEQ ID NO: 37 and the isolated nucleic acid encoding the light chain of SEQ ID NO: 41 under conditions wherein the isolated nucleic acid(s) are expressed and an antibody is produced.

In other embodiments, an isolated antibody specific for human CD38 (SEQ ID NO: 1) is described. This antibody is composed of six CDRs, wherein each CDR of this antibody can differ from SEQ ID NO: 9, SEQ ID NO: 13, SEQ ID NO: 17, SEQ ID NO: 25, SEQ ID NO: 29, and SEQ ID NO: 33 by 0, 1, or 2 amino acid substitutions.

In some embodiments, an isolated anti-CD38 antibody is provided that binds specifically to human CD38 (SEQ ID NO: 1), wherein the antibody binds to human CD38 with a KD of about $10^{-6}$, $10^{-7}$, $10^{-8}$, $10^{-9}$ or more.

In some embodiments, antibodies that compete with IgG418 for binding to human CD38 are provided.

In some embodiments, a composition comprising the anti-CD38 antibody or antibody fragment thereof is provided.

In some embodiments, a method of treating a disease associated with CD38 expression is provided, which comprises administering to a subject in need thereof an effective amount of the anti-CD38 antibody or antibody fragment thereof, or the composition comprising the anti-CD38 antibody or antibody fragment thereof.

In some embodiments, use of the anti-CD38 antibody or antibody fragment thereof in the manufacture of a medicament for the treatment of a disease associated with CD38 expression is provided.

In some embodiments, a pharmaceutical composition for use in the treatment of a disease associated with CD38 expression is provided, wherein the pharmaceutical composition comprises the anti-CD38 antibody or antibody fragment thereof.

These and other embodiments, features and potential advantages will become apparent with reference to the following description and drawings.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 1 is a graph describing IgG418 affinity calculation to CD38 recombinant protein using capture ELISA with Darzalex as a control.

FIG. 2 depicts the affinity measurement of IgG418 to CD38 expressed on Daudi cells using flowcytometry with Darzalex as a control.

FIG. 3 depicts the IgG418 binding to a different epitope on CD38 from that of Darzalex using competitive ELISA.

DETAILED DESCRIPTION OF THE INVENTION

Figure 4:
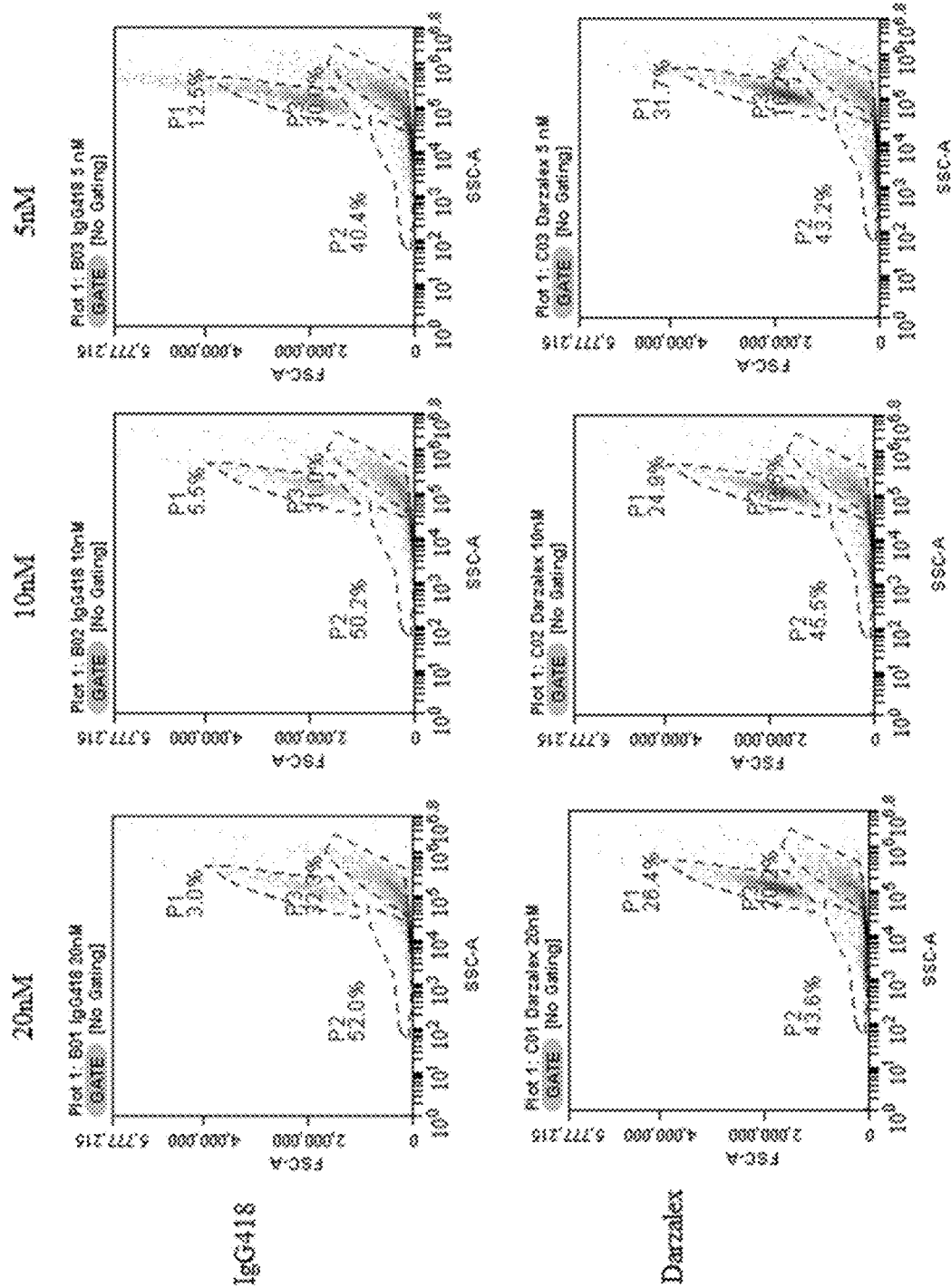
FIG. 4 shows the statistical analysis of CDC activity of IgG418 on Daudi cells using Darzalex as a control.
Figure 4:
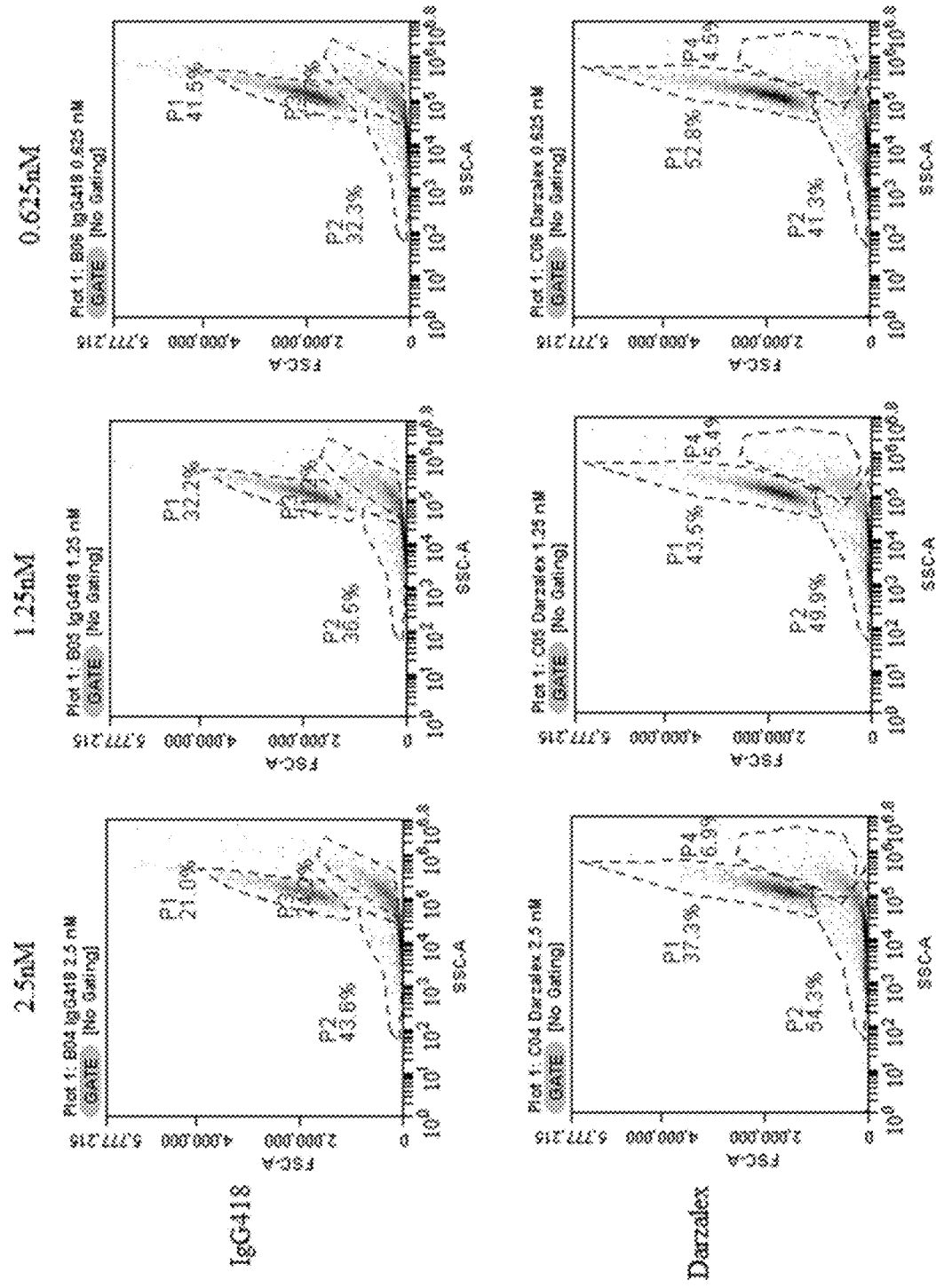
Figure 4:
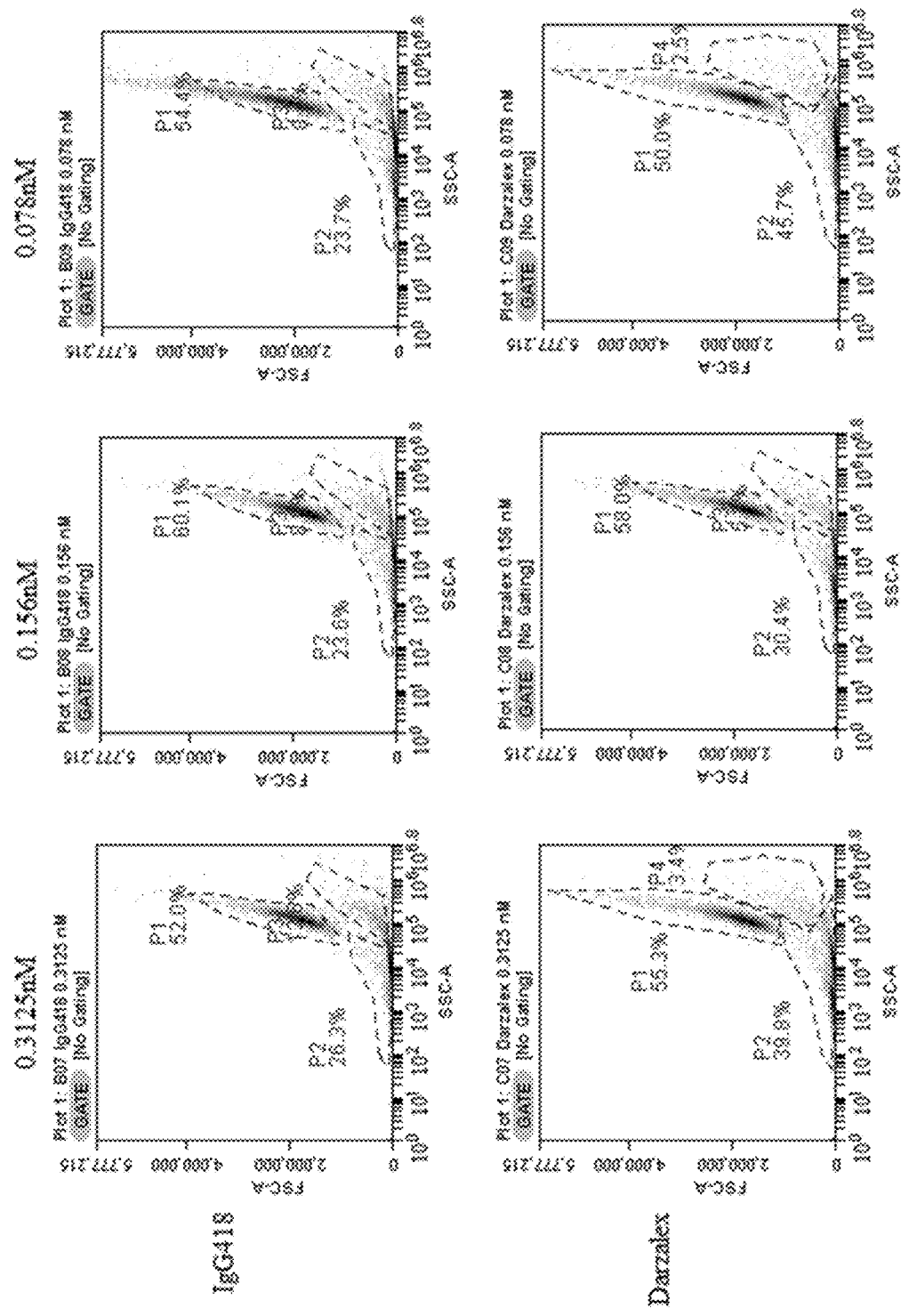

The extracellular domain of CD38 has been shown to possess bifunctional enzyme activity, having both ADP-ribosyl cyclase as well as ADP-ribosyl hydrolase activities. Thus, CD38 can catalyze the conversion of NAD to cADPR (cyclase) and can further hydrolyze it to ADP-ribose (hydrolase). cADPR is involved in the mobilization. of calcium from intracellular stores which is a second messenger activity important for cellular proliferation, differentiation, and apoptosis.

Increased expression of CD38 has been documented in a variety of diseases of hematopoietic origin and has been described as a negative prognostic marker in chronic lymphoblastic leukemia. Such diseases include but are not restricted to, multiple myeloma (Jackson et al. (1988)), chronic lymphoblastic leukemia (Moribito et al. (2001), Jelinek et (2001), Chevalier et al. (2002), Dürig et al. (2002)), B-cell chronic lymphocytic leukemia, acute lymphoblastic leukemia (Keyhani et al (2000)) including B-cell acute lymphocytic leukemia, Waldenstrom macroglobulinemia, primary systemic amyloidosis, mantle-cell lymphoma, pro-lymphocytic/myelocytic leukemia, acute myeloid leukemia (Keyhani et al. (1993)), chronic myeloid leukemia (Marinov et al., (1993)), follicular lymphoma, NK-cell leukemia and plasma-cell leukemia. As such, CD38 provides a useful target in the treatment of diseases of the hematopoietic system.

Several anti-CD38 antibodies are in clinical trials for the treatment of CD38-associated cancers. Accordingly, antibodies to CD38 with therapeutic effect and/or diagnostic applications are useful. The invention provides one different anti-CD38 sets CDRs that bind to different epitopes of CD38, and antibodies that contain these CDRs.

CD38 antibody therapy for myeloma has been approved since 2015. In addition, several other studies recently indicated that CD38 antibody therapy could abrogate the resistance of tumor cells to PD1/PDL1 therapy. Therefore, the anti-CD38 antibody of this invention finds diagnostic and therapeutic applications in the cancers not only limited to myeloma, but also all other kind of cancers.

In addition, the present invention shows that anti-CD38 antibodies find use in the diagnosis and/or treatment of inflammation and/or immunological disorders associated with activated lymphocytes, including specifically autoimmune diseases. As shown herein, CD38 is expressed in immature hematopoeitic cells, down regulated in mature cells, and re-expressed at high levels in activated lymphocytes and plasma cells. For example, high CD38 expression is seen in activated B cells, plasma cells, activated CD4+ cells, activated CD8+ cells, NK cells, NKT cells, mature dendritic cells (DCs) and activated monocytes.

The findings herein are surprising in that the presence of autoantibodies to CD38 has been associated with diabetes, chronic autoimmune thyroiditis and Graves' disease (see Antonelli et al, Clin. Exp. Immunol. 2001 126:426-431; Mallone et al., Diabetes 50:752 (2001) and Antonelli et al., J. Endocrinol. Invest. 27:695-707 (2004), all of which are incorporated by reference.

Accordingly, the antibody of the invention find use in the diagnosis and/or treatment of a number of diseases, including, but not limited to autoimmune diseases as discussed below, including but not limited to systemic lupus erythematosus (SLE), rheumatoid arthritis (RA), Systemic Sclerosis (SSc), Multiple Sclerosis (MS), inflammatory bowel disease (IBD), diabetes and ulcerative colitis.

Thus, for example, patients with high plasma cell content can be selected, such as SLE patients who exhibit high plasma cells, as well as RA patients shown to be unresponsive to CD20 based therapies.

The therapeutic anti-CD38 antibodies of the present invention bind to CD38 positive cells, resulting depletion of these cells, such as activated lymphocytes, through multiple mechanisms of action, including, but not limited to, CDC, ADCC, ADCP and apoptosis pathways, as outlined herein, leading to the treatment and/or amelioration of autoimmune diseases.

Antibodies

The present invention provides anti-CD38 antibodies, generally therapeutic and/or diagnostic antibodies as described herein. Antibodies that find use in the present invention can take on a number of formats as described herein, including traditional antibodies as well as antibody derivatives, fragments and mimetics, described below. Essentially, the invention provides antibody structures that contain a set of 6 CDRs as defined herein (including small numbers of amino acid changes as described below).

Traditional antibody structural units typically comprise a tetramer. Each tetramer is typically composed of two identical pairs of polypeptide chains, each pair having one "light" (typically having a molecular weight of about 25 kDa) and one "heavy" chain (typically having a molecular weight of about 50-70 kDa). Human light chains are classified as kappa and lambda light chains. Heavy chains are classified as mu, delta, gamma, alpha, or epsilon, and define the antibody's isotype as IgM, IgD, IgG, and IgE, respectively. IgG has several subclasses, including, but not limited to IgG1, IgG2, IgG3, and IgG4. IgM has subclasses, including, but not limited to, IgM1 and IgM2. Thus, "isotype" as used herein is meant any of the subclasses of immunoglobulins defined by the chemical and antigenic characteristics of their constant regions. The known human immunoglobulin isotypes are IgG1, IgG2, IgG3, IgG4, IgA1, IgA2, IgM1, IgM2, IgD, and IgE. It should be understood that therapeutic antibodies can also comprise hybrids of isotypes and/or subclasses.

The amino-terminal portion of each chain includes a variable region of about 100 to 110 or more amino acids primarily responsible for antigen recognition. In the variable region, three loops are gathered for each of the V domains of the heavy chain and light chain to form an antigen-binding site. Each of the loops is referred to as a complementarity-determining region (hereinafter referred to as a "CDR"), in which the variation in the amino acid sequence is most significant. "Variable" refers to the fact that certain segments of the variable region differ extensively in sequence among antibodies. Variability within the variable region is not evenly distributed. Instead, the V regions consist of relatively invariant stretches called framework regions (FRs) of 15-30 amino acids separated by shorter regions of extreme variability called "hypervariable regions" that are each 9-15 amino acids long or longer.

Each VH and VL is composed of three hypervariable regions ("complementary determining regions," "CDRs") and four FRs, arranged from amino-terminus to carboxy-terminus in the following order: FR1-CDR1-FR2-CDR2-FR3-CDR3-FR4.

The hypervariable region generally encompasses amino acid residues from about amino acid residues 24-34 (LCDR1; "L" denotes light chain), 50-56 (LCDR2) and 89-97 (LCDR3) in the light chain variable region and around about 31-35B (HCDR1; "H" denotes heavy chain), 50-65 (HCDR2), and 95-102 (HCDR3) in the heavy chain variable region; Kabat et al., SEQUENCES OF PROTEINS OF IMMUNOLOGICAL INTEREST, 5th Ed. Public Health Service, National Institutes of Health, Bethesda, Md. (1991) and/or those residues forming a hypervariable loop (e.g. residues 26-32 (LCDR1), 50-52 (LCDR2) and 91-96 (LCDR3) in the light chain variable region and 26-32 (HCDR1), 53-55 (HCDR2) and 96-101 (HCDR3) in the heavy chain variable region; Chothia and Lesk (1987) J. Mol. Biol. 196:901-917. Specific CDRs of the invention are described below.

Throughout the present specification, the Kabat numbering system is generally used when referring to a residue in the variable domain (approximately, residues 1-107 of the light chain variable region and residues 1-113 of the heavy chain variable region) (e.g, Kabat et al., supra (1991)), with the EU number system used for the Fc region.

The CDRs contribute to the formation of the antigen-binding, or more specifically, epitope binding site of antibodies. "Epitope" refers to a determinant that interacts with a specific antigen binding site in the variable region of an antibody molecule known as a paratope. Epitopes are groupings of molecules such as amino acids or sugar side chains and usually have specific structural characteristics, as well as specific charge characteristics. A single antigen may have more than one epitope. For example, as shown herein, the two different antibodies referred to herein as "IgG418" and Darzalex bind to different epitopes on the CD38 molecule.

The epitope may comprise amino acid residues directly involved in the binding (also called immunodominant component of the epitope) and other amino acid residues, which are not directly involved in the binding, such as amino acid residues which are effectively blocked by the specifically antigen binding peptide; in other words, the amino acid residue is within the footprint of the specifically antigen binding peptide.

Epitopes may be either conformational or linear. A conformational epitope is produced by spatially juxtaposed amino acids from different segments of the linear polypeptide chain. A linear epitope is one produced by adjacent amino acid residues in a polypeptide chain. Conformational and non-conformational epitopes may be distinguished in that the binding to the former but not the latter is lost in the presence of denaturing solvents.

An epitope typically includes at least 3, and more usually, at least 5 or 8-10 amino acids in a unique spatial conformation. Antibodies that recognize the same epitope can be verified in a simple immunoassay showing the ability of one antibody to block the binding of another antibody to a target antigen.

In the present invention, IgG418 binds to a different epitope from that of Darzalex because they do not compete the same epitope in competitive ELISA assay.

Thus, in some embodiments, antibodies that compete with scFv418 or IgG418 by binding at either of their epitope can be used to treat cancers and autoimmune diseases. It should be noted that antibodies that compete with scFv418 or IgG418 find use in the present invention.

The carboxy-terminal portion of each chain defines a constant region primarily responsible for effector function. Kabat et a collected numerous primary sequences of the variable regions of heavy chains and light chains. Based on the degree of conservation of the sequences, they classified individual primary sequences into the CDR and the framework and made a list thereof (see SEQUENCES OF IMMUNOLOGICAL INTEREST, 5th edition, NIH publication, No. 91-3242, E. A. Kabat et al., entirely incorporated by reference).

In the IgG subclass of immunoglobulins, there are several immunoglobulin domains in the heavy chain. By "immunoglobulin (Ig) domain" herein is meant a region of an immunoglobulin having a distinct tertiary structure. Of interest in the present invention are the heavy chain domains, including, the constant heavy (CH) domains and the hinge domains. In the context of IgG antibodies, the IgG isotypes each have three CH regions. Accordingly, "CH" domains in the context of IgG are as follows: "CH1" refers to positions 118-220 according to the EU index as in Kabat, "CH2" refers to positions 237-340 according to the EU index as in Kabat, and "CH3" refers to positions 341-447 according to the EU index as in Kabat.

Another type of Ig domain of the heavy chain is the hinge region. By "hinge" or "hinge region" or "antibody hinge region" or "immunoglobulin hinge region" herein is meant the flexible polypeptide comprising the amino acids between the first and second constant domains of an antibody. Structurally, the IgG CH1 domain ends at EU position 220, and the IgG CH2 domain begins at residue EU position 237. Thus for IgG the antibody hinge is herein defined to include positions 221 (D221 in IgG1) to 236 (G236 in IgG1), wherein the numbering is according to the EU index as in Kabat. In some embodiments, for example in the context of an Fc region, the lower hinge is included, with the "lower hinge" generally referring to positions 226 or 230.

Of particular interest in the present invention are the Fc regions. By "Fc" or "Fc region" or "Fc domain" as used herein is meant the polypeptide comprising the constant region of an antibody excluding the first constant region immunoglobulin domain and in some cases, part of the hinge. Thus Fc refers to the last two constant region immunoglobulin domains of IgA, IgD, and IgG, the last three constant region immunoglobulin domains of IgE and IgM, and the flexible hinge N-terminal to these domains. For IgA and IgM, Fc may include the J chain. For IgG, the Fc domain comprises immunoglobulin domains Cγ2 and Cγ3 (Cγ2 and Cγ3) and the lower hinge region between Cγ1 (Cγ1) and Cγ2 (Cγ2). Although the boundaries of the Fc region may vary, the human IgG heavy chain Fc region is usually defined to include residues C226 or P230 to its carboxyl-terminus, wherein the numbering is according to the EU index as in Kabat. In some embodiments, as is more hilly described below, amino acid modifications are made to the Fc region, for example to alter binding to one or more FcγR receptors or to the FcRn receptor.

In some embodiments, the antibodies are full length. By "full length antibody" herein is meant the structure that constitutes the natural biological form of an antibody, including variable and constant regions, including one or more modifications as outlined herein.

Alternatively, the antibodies can be a variety of structures, including, but not limited to, antibody fragments, monoclonal antibodies, bispecific antibodies, minibodies, domain antibodies, synthetic antibodies (sometimes referred to herein as "antibody mimetics"), chimeric antibodies, humanized antibodies, antibody fusions (sometimes referred to as "antibody conjugates"), and fragments of each, respectively.

In one embodiment, the antibody is an antibody fragment. Specific antibody fragments include, but are not limited to, (i) the Fab fragment consisting of VL, VH, CL and CH1 domains, (ii) the Fd fragment consisting of the VH and CH1 domains, (iii) the Fv fragment consisting of the VL and VH domains of a single antibody; (iv) the dAb fragment (Ward et al., 1989, Nature 341:544-546, entirely incorporated by reference) which consists of a single variable, (v) isolated CDR regions, (vi) F(ab')2 fragments, a bivalent fragment comprising two linked Fab fragments (vii) single chain Fv molecules (scFv), wherein a VH domain and a VL domain are linked by a peptide linker which allows the two domains to associate to form an antigen binding site (Bird et al., 1988, Science 242:423-426, Huston et al., 1988, Proc. Natl. Acad. Sci. U.S.A. 85:5879-5883, entirely incorporated by reference), (viii) bispecific single chain Fv (WO 03/11161, hereby incorporated by reference) and (ix) "diabodies" or "triabodies", multivalent or multispecific fragments constructed by gene fusion (Tomlinson et. al., 2000, Methods Enzymol. 326:461-479; WO94/13804; Holliger et al., 1993, Proc. Natl. Acad. Sci, U.S.A. 90:6444-6448, all entirely incorporated by reference).

Chimeric and Humanized Antibodies

In some embodiments, the antibody can be a mixture from different species, e.g. a chimeric antibody and/or a humanized antibody. That is, in the present invention, the CDR sets can be used with framework and constant regions other than those specifically described by sequence herein.

In general, both "chimeric antibodies" and "humanized antibodies" refer to antibodies that combine regions from more than one species. For example, "chimeric antibodies" traditionally comprise variable region(s) from a mouse (or rat, in some cases) and the constant region(s) from a human. "Humanized antibodies" generally refer to non-human antibodies that have had the variable-domain framework regions swapped for sequences found in human antibodies. Generally, in a humanized antibody, the entire antibody, except the CDRs, is encoded by a polynucleotide of human origin or is identical to such an antibody except within its CDRs. The CDRs, some or all of which are encoded by nucleic acids originating in a non-human organism, are grafted into the beta-sheet framework of a human antibody variable region to create an antibody, the specificity of which is determined by the engrafted CDRs. The creation of such antibodies is described in, e.g., WO 92/11018, Jones, 1986, Nature 321: 522-525, Verhoeyen et al., 1988, Science 239: 1534-1536, all entirely incorporated by reference. "Backmutation" of selected acceptor framework residues to the corresponding donor residues is often required to regain affinity that is lost in the initial grafted construct (U.S. Pat. Nos. 5,530,101; 5,585,089; 5,693,761; 5,693,762; 6,180,370; 5,859,205; 5,821,337; 6,054,297; 6,407,213, all entirely incorporated by reference). The humanized antibody optimally also will comprise at least a portion of an immunoglobulin constant region, typically that of a human immunoglobulin, and thus will typically comprise a human Fc region. Humanized antibodies can also be generated using mice with a genetically engineered immune system. Roque et al., 2004, Biotechnol. Prog. 20:639-654, entirely incorporated by reference. A variety of techniques and methods for humanizing and reshaping non-human antibodies are well known in the art (See Tsurushita & Vasquez, 2004, Humanization of Monoclonal Antibodies, Molecular Biology of B Cells, 533-545, Elsevier Science (USA), and references cited therein, all entirely incorporated by reference). Humanization methods include but are not limited to methods described in Jones et al., 1986, Nature 321:522-525; Riechmann et al., 1988; Nature 332:323-329; Verhoeyen et al., 1988, Science, 239:1534-1536; Queen et al., 1989, Proc. Natl. Acad. Sci. USA 86:10029-33; He et al., 1998, J. Immunol. 160: 1029-1035; Carter et al., 1992, Proc Natl Acad Sci USA 89:4285-9, Presta et al., 1997, Cancer Res. 57(20):4593-9; Gorman et al., 1991, Proc. Natl. Acad. Sci. USA 88:4181-4185; O'Connor et al., 1998, Protein Eng 11:321-8, all entirely incorporated by reference. Humanization or other methods of reducing the immunogenicity of nonhuman antibody variable regions may include resurfacing methods, as described for example in Roguska et al., 1994, Proc. Natl. Acad. Sci. USA 91:969-973, entirely incorporated by reference. In one embodiment, the parent antibody has been affinity matured, as is known in the art. Structure-based methods may be employed for humanization and affinity maturation, for example as described in U.S. Ser. No. 11/004,590. Selection based methods may be employed to humanize and/or affinity mature antibody variable regions, including but not limited to methods described in Wu et al., 1999, J. Mol. Biol. 294: 151-162; Baca et al., 1997, J. Biol. Chem. 272(16): 10678-10684; Rosok et al., 1996, J. Biol. Chem. 271(37): 22611-22618; Rader et al., 1998, Proc. Natl. Acad. Sci. USA 95: 8910-8915; Krauss et al., 2003, Protein Engineering 16(10):753-759, all entirely incorporated by reference. Other humanization methods may involve the grafting of only parts of the CDRs, including but not limited to methods described in U.S. Ser. No. 09/810,510; Tan et al., 2002, J. Immunol. 169:1119-1125; De Pascalis et al., 2002, J. Immunol. 169:3076-3084, all entirely incorporated by reference.

In one embodiment, the antibodies of the invention can be multispecific antibodies, and notably bispecific antibodies, also sometimes referred to as "diabodies". These are antibodies that bind to two (or more) different antigens, or different epitopes on the same antigen. Diabodies can be manufactured in a variety of ways known in the art (Holliger and Winter, 1993, Current Opinion Biotechnol. 4:446-449, entirely incorporated by reference), e.g., prepared chemically or from hybrid hybridomas.

In one embodiment, the antibody is a minibody. Minibodies are minimized antibody-like proteins comprising a scFv joined to a CH3 domain. Hu et al., 1996, Cancer Res. 56:3055-3061, entirely incorporated by reference. In some cases, the scFv can be joined to the Fc region, and may include some or the entire hinge region.

The antibodies of the present invention are generally isolated or recombinant. "Isolated," when used to describe the various polypeptides disclosed herein, means a polypeptide that has been identified and separated and/or recovered from a cell or cell culture from which it was expressed. Ordinarily, an isolated polypeptide will be prepared by at least one purification step. An "isolated antibody," refers to an antibody which is substantially free of other antibodies having different antigenic specificities. For instance, an isolated antibody that specifically binds to CD38 is substantially free of antibodies that specifically bind antigens other than CD38.

An isolated antibody that specifically binds to an epitope, isoform or variant of human CD38 or cynomolgus CD38 may, however, have cross-reactivity to other related antigens, for instance from other species, such as CD38 species homologs. Moreover, an isolated antibody may be substantially free of other cellular material and/or chemicals.

Isolated monoclonal antibodies, having different specificities, can be combined in a well-defined composition. Thus for example the IgG418 can be combined in a single formulation, if desired.

The anti-CD38 antibodies of the present invention specifically bind CD38 ligand (e.g. the human CD38 proteins of SEQ NOs: 1. "Specific binding" or "specifically binds to" or is "specific for" a particular antigen or an epitope means binding that is measurably different from a non-specific interaction. Specific binding can be measured, for example, by determining binding of a molecule compared to binding of a control molecule, which generally is a molecule of similar structure that does not have binding activity. For example, specific binding can be determined by competition with a control molecule that is similar to the target.

Specific binding for a particular antigen or an epitope can be exhibited, for example, by an antibody having a KD for an antigen or epitope of at least about $10^{-4}$M, at least about $10^{-5}$M, at least about $10^{-6}$M, at least about $10^{-7}$M, at least about $10^{-8}$M, at least about $10^{-9}$M, alternatively at least about $10^{-10}$ M, at least about $10^{-11}$M, at least about $10^{-12}$ M, or greater, where KD refers to a dissociation rate of a particular antibody-antigen interaction. Typically, an antibody that specifically binds an antigen will have a KD that is 20-, 50-, 100-, 500-, 1000-, 5,000-, 10,000- or more times greater for a control molecule relative to the antigen or epitope.

Also, specific binding for a particular antigen or an epitope can be exhibited, for example, by an antibody having a KA or Ka for an antigen or epitope of at least 20-, 50-, 100-, 500-, 1000-, 5,000-, 10,000- or more times greater for the epitope relative to a control, where KA or Ka refers to an association rate of a particular antibody-antigen interaction.

Antibody Modifications

The present invention further provides variant antibodies. That is, there are a number of modifications that can be made to the antibodies of the invention, including, but not limited to, amino acid modifications in the CDRs (affinity maturation), amino acid modifications in the Fc region, glycosylation variants, covalent modifications of other types, etc.

By "variant" herein is meant a polypeptide sequence that differs from that of a parent polypeptide by virtue of at least one amino acid modification, Amino acid modifications can include substitutions, insertions and deletions, with the former being preferred in many cases.

In general, variants can include any number of modifications, as long as the function of the protein is still present, as described herein. That is, in the case of amino acid variants generated with the CDRs of IgG418, for example, the antibody should specifically bind to human CD38. Similarly, if amino acid variants are generated with the Fc region, for example, the variant antibodies should maintain the required receptor binding functions for the particular application or indication of the antibody.

However, in general, from 1, 2, 3, 4, 5, 6, 7, 8, 9 or 10 amino acid substitutions are generally utilized as often the goal is to alter function with a minimal number of modifications. In some cases, there are from 1 to 5 modifications, with from 1-2, 1-3 and 1-4 also finding use in many embodiments.

It should be noted that the number of amino acid modifications may be within functional domains: for example, it may be desirable to have from 1-5 modifications in the Fc region of wild-type or engineered proteins, as well as from 1 to 5 modifications in the Fv region, for example. A variant polypeptide sequence will preferably possess at least about 80%, 85%, 90%, 95% or up to 98 or 99% identity to the parent sequences (e.g. the variable regions, the constant regions, and/or the heavy and light chain sequences for IgG418). It should be noted that depending on the size of the sequence, the percent identity will depend on the number of amino acids.

By "amino acid substitution" or "substitution" herein is meant the replacement of an amino acid at a particular position in a parent polypeptide sequence with another amino acid. For example, the substitution S100A refers to a variant polypeptide in which the serine at position 100 is replaced with alanine. By "amino acid insertion" or "insertion" as used herein is meant the addition of an amino acid at a particular position in a parent polypeptide sequence. By "amino acid deletion" or "deletion" as used herein is meant the removal of an amino acid at a particular position in a parent polypeptide sequence.

By "parent polypeptide", "parent protein", "precursor polypeptide", or "precursor protein" as used herein is meant an unmodified polypeptide that is subsequently modified to generate a variant. In general, the parent polypeptides herein are scFv418 and IgG418. Parent polypeptide may refer to the polypeptide itself, compositions that comprise the parent polypeptide, or the amino acid sequence that encodes it. Accordingly, by "parent Fc polypeptide" as used herein is meant an Fc polypeptide that is modified to generate a variant, and by "parent antibody" as used herein is meant an antibody that is modified to generate a variant antibody.

By "wild type" or "WT" or "native" herein is meant an amino acid sequence or a nucleotide sequence that is found in nature, including allelic variations. A WT protein, polypeptide, antibody, immunoglobulin, IgG, etc. has an amino acid sequence or a nucleotide sequence that has not been intentionally modified.

By "variant Fc region" herein is meant an Fc sequence that differs from that of a wild-type Fc sequence by virtue of at least one amino acid modification. Fc variant may refer to the Fc polypeptide itself compositions comprising the Fc variant polypeptide, or the amino acid sequence.

In some embodiments, one or more amino acid modifications are made in one or more of the CDRs of the antibody IgG418. general, only 1 or 2 or 3 amino acids are substituted in any single CDR, and generally no more than from 4, 5, 6, 7, 8 9 or 10 changes are made within a set of CDRs. However, it should be appreciated that any combination of no substitutions, 1, 2 or 3 substitutions in any CDR can be independently and optionally combined with any other substitution.

In some cases, amino acid modifications in the CDRs are referred to as "affinity maturation." An "affinity matured" antibody is one having one or more alteration(s) one or more CDRs which results in an improvement in the affinity of the antibody for antigen, compared to a parent antibody which does not possess those alteration(s). In some cases, although rare, it may be desirable to decrease the affinity of an antibody to its antigen, but this is generally not preferred.

Affinity maturation can be done to increase the binding affinity of the antibody for the antigen by at least about 10% to 50-100-150% or more, or from 1 to 5-fold as compared to the "parent" antibody. Preferred affinity matured antibodies will have nanomolar or even picomolar affinities for the target antigen. Affinity matured antibodies are produced by known procedures. See, for example, Marks et al., 1992, Biotechnology 10:779-783 that describes affinity Maturation by variable heavy chain (VH) and variable tight chain (VL) domain shuffling. Random mutagenesis of CDR and/or framework residues is described in: Barbas, et al. 1994, Proc. Nat. Acad. Sci, USA 91:3809-3813; Shier et al., 1995, Gene 169:147-155; Yelton et al, 1995, J. Immunol. 155: 1994-2004; Jackson et al., 1995, J. Immunol. 154(7):3310-9; and Hawkins et al, 1992, J. Mol. Biol. 226:889-896, for example.

Alternatively, amino acid modifications can be made in one or more of the CDRs of the antibodies of the invention that are "silent"; e.g. that do not significantly alter the affinity of the antibody for the antigen. These can be made for a number of reasons, including optimizing expression (as can be done for the nucleic acids encoding the antibodies of the invention).

Thus, included within the definition of the CDRs and antibodies of the invention are variant CDRs and antibodies; that is, the antibodies of the invention can include amino acid modifications in one or more of the CDRs of IgG418. In addition, as outlined below, amino acid modifications can also independently and optionally be made in any region outside the CDRs, including framework and constant regions.

In some embodiments, the anti-CD38 antibodies of the invention are composed of a variant Fc domain. As is known in the art, the Fc region of an antibody interacts with a number of Fc receptors and ligands, imparting an array of important functional capabilities referred to as effector functions. These Fc receptors include, but are not limited to, (in humans) FcγRI (CD64) including isoforms FcγRIa, FcγRIb, and FcγRIc; FcγRII (CD32), including isoforms (including allotypes H131 and R131), FcγRIIb (including FcγRIIb-1 and FcγRIIb-2), and FcγRIIc; and FcγRIII (CD1.6), including isoforms FcγRIIIa (including allotypes V158 and F158, correlated to antibody-dependent cell cytotoxicity (ADCC)) and FcγRIIIb (including allotypes FcγRIIIb-NA1 and FcγRIIIb-NA2), FcRn (the neonatal receptor), C1q (complement protein involved in complement dependent cytotoxicity (CDC)) and FcRn (the neonatal receptor involved in serum half-life). Suitable modifications can be made at one or more positions as is generally outlined, for example in U.S. patent application Ser. No. 11/841,654 and references cited therein, US 2004/013210, US 2005/0054832, US 2006/0024298, US 2006/0121032, US 2006/0235208, US 2007/0148170, U.S. Ser. No. 12/341,769, U.S. Pat. Nos. 6,737,056, 7,670,600, 6,086,875 all of which are expressly incorporated by reference in their entirety, and in particular for specific amino acid substitutions that increase binding to Fc receptors.

In addition to the modifications outlined above, other modifications can be made. For example, the molecules may be stabilized by the incorporation of disulfide bridges linking the VH and VL domains (Reiter et al., 1996, Nature Biotech. 14:1239-1245, entirely incorporated by reference). In addition, there are a variety of covalent modifications of antibodies that can be made as outlined below.

Covalent modifications of antibodies are included within the scope of this invention, and are generally, but not always, done post-translationally. For example, several types of covalent modifications of the antibody are introduced into the molecule by reacting specific amino acid residues of the antibody with an organic derivatizing agent that is capable of reacting with selected side chains or the N- or C-terminal residues.

Cysteinyl residues most commonly are reacted with α-haloacetates (and corresponding amines), such as chloroacetic acid or chloroacetamide, to give carboxymethyl or carboxyamidomethyl derivatives. Cysteinyl residues may also be derivatized by reaction with bromotrifluoroacetone, α-bromo-β-(5-imidozoyl)propionic acid, chloroacetyl phosphate, N-alkylmaleimides, 3-nitro-2-pyridyl disulfide, methyl 2-pyridyl disulfide, p-chloromercuribenzoate, 2-chloromercuri-4-nitrophenol, or chloro-7-nitrobenzo-2-oxa-1,3-diazole and the like.

Histidyl residues are derivatized by reaction with diethylpyrocarbonate at pH 5.5-7.0 because this agent is relatively specific for the histidyl side chain, Para-bromophenacyl bromide also is useful; the reaction is preferably performed in 0.1M sodium cacodylate at pH 6.0.

Lysinyl and amino terminal residues are reacted with succinic or other carboxylic acid anhydrides. Derivatization with these agents has the effect of reversing the charge of the lysinyl residues. Other suitable reagents for derivatizing alpha-amino-containing residues include imidoesters such as methyl picolinimidate; pyridoxal phosphate; pyridoxal; chloroborohydride; trinitrobenzenesulfonic acid; O-methylisourea; 2,4-pentanedione; and transaminase-catalyzed reaction with glyoxylate.

Arginyl residues are modified by reaction with one or several conventional reagents, among them phenylglyoxal, 2,3-butanedione, 1,2-cyclohexanedione, and ninhydrin. Derivatization of arginine residues requires that the reaction be performed in alkaline conditions because of the high pKa of the guanidine functional group. Furthermore, these reagents may react with the groups of lysine as well as the arginine epsilon-amino group.

The specific modification of tyrosyl residues may be made, with particular interest in introducing spectral labels into tyrosyl residues by reaction with aromatic diazonium compounds or tetranitromethane. Most commonly, N-acetylimidizole and tetranitromethane are used to form O-acetyl tyrosyl species and 3-nitro derivatives, respectively, Tyrosyl residues are iodinated using 125I or 131I to prepare labeled proteins for use in radioimmunoassay, the chloramine T method described above being suitable.

Carboxyl side groups (aspartyl or glutamyl) are selectively modified by reaction with carbodiimides (R'—N=C=N—R'), where R and R' are optionally different alkyl groups, such as 1-cyclohexyl-3-(2-morpholinyl-4-ethyl)carbodiimide or 1-ethyl-3-(4-azonia-4,4-dimethylpentyl)carbodiimide. Furthermore, aspartyl and glutamyl residues are converted to asparaginyl and glutaminyl residues by reaction with ammonium ions.

Derivatization with bifunctional agents is useful for cross-linking antibodies to a water-insoluble support matrix or surface for use in a variety of methods, in addition to methods described below. Commonly used crosslinking agents include, e.g., 1,1-bis(diazoacetyl)-2-phenylethane, glutaraldehyde, N-hydroxysuccinimide esters, for example, esters with 4-azidosalicylic acid, homobifunctional imidoesters, including disuccinimidyl esters such as 3,3'-dithiobis (succinimidylpropionate), and bifunctional maleimides such as bis-N-maleimido-1,8-octane. Derivatizing agents such as methyl-3-[(p-azidophenyl)dithio]propioimidate yield photoactivatable intermediates that are capable of forming crosslinks in the presence of light. Alternatively, reactive water-insoluble matrices such as cynomolgusogen bromide-activated carbohydrates and the reactive substrates described in U.S. Pat. Nos. 3,969,287; 3,691,016; 4,195,128; 4,247,642; 4,229,537; and 4,330,440, all entirely incorporated by reference, are employed for protein immobilization.

Glutaminyl and asparaginyl residues are frequently deamidated to the corresponding glutamyl and aspartyl residues, respectively. Alternatively, these residues are deamidated under mildly acidic conditions. Either form of these residues falls within the scope of this invention.

Other modifications include hydroxylation of proline and lysine, phosphorylation of hydroxyl groups of seryl or threonyl residues, methylation of the α-amino groups of lysine, arginine, and histidine side chains (T. E. Creighton, Proteins: Structure and Molecular Properties, W.H. Freeman & Co., San Francisco, pp. 79-86 [1983], entirely incorporated by reference), acetylation of the N-terminal amine, and amidation of any C-terminal carboxyl group.

In addition, as will be appreciated by those in the art, labels (including fluorescent, enzymatic, magnetic, radioactive, etc. can all be added to the antibodies (as well as the other compositions of the invention).

Glycosylation

Another type of covalent modification is alterations in glycosylation, another embodiment, the antibodies disclosed herein can be modified to include one or more engineered glycoforms. By "engineered glycoform" as used herein is meant a carbohydrate composition that is covalently attached to the antibody, wherein said carbohydrate composition differs chemically from that of a parent antibody. Engineered glycoforms may be useful for a variety of purposes, including but not limited to enhancing or reducing effector function. A preferred form of engineered glycoform is afucosylation, which has been shown to be correlated to an increase in ADCC function, presumably through tighter binding to the FcγRIIIa receptor. In this context, "afucosylation" means that the majority of the antibody produced in the host cells is substantially devoid of fucose, e.g. 90-95-98% of the generated antibodies do not have appreciable fucose as a component of the carbohydrate moiety of the antibody (generally attached at N297 in the Fc region). Defined functionally, afucosylated antibodies generally exhibit at least a 50% or higher affinity to the FcγRIIIa receptor.

Engineered glycoforms may be generated by a variety of methods known in the art (Umaña et al., 1999, Nat Biotechnol 17:176-180; Davies et al., 2001, Biotechnol Bioeng 74:288-294; Shields et al., 2002, J Biol Chem 277:26733-26740; Shinkawa et al., 2003, J Biol Chem 278:3466-3473; U.S. Pat. No. 6,602,684; U.S. Ser. No. 10/277,370; U.S. Ser. No. 10/113,929; PCT WO 00/61739A1; PCT WO 01/29246A1; PCT WO 02/31140A1; PCT WO 02/30954A1, all entirely incorporated by reference; (Potelligent® technology [Biowa, Inc., Princeton, N.J.]; GlycoMAb® glycosylation engineering technology [Glycart Biotechnology AG, Zurich, Switzerland]). Many of these techniques are based on controlling the level of fucosylated and/or bisecting oligosaccharides that are covalently attached to the Fc region, for example by expressing an IgG in various organisms or cell lines, engineered or otherwise (for example Lec-13 CHO cells or rat hybridoma YB2/0 cells, by regulating enzymes involved in the glycosylation pathway (for example FUT8 [α1,6-fucosyltranserase] and/or β1-4N-acetylglucosaminyltransferase III [GnTITT]), or by modifying carbohydrate(s) after the IgG has been expressed. For example, the "sugar engineered antibody" or "SEA technology" of Seattle Genetics functions by adding modified saccharides that inhibit fucosylation during production; see for example 20090317869, hereby incorporated by reference in its entirety. Engineered glycoform typically refers to the different carbohydrate or oligosaccharide; thus an antibody can include an engineered glycoform.

Alternatively, engineered glycoform may refer to the IgG variant that comprises the different carbohydrate or oligosaccharide. As is known in the art, glycosylation patterns can depend on both the sequence of the protein (e.g., the presence or absence of particular glycosylation amino acid residues, discussed below), or the host cell or organism in which the protein is produced. Particular expression systems are discussed below.

Glycosylation of polypeptides is typically either N-linked or O-linked. N-linked refers to the attachment of the carbohydrate moiety to the side chain of an asparagine residue. The tri-peptide sequences asparagine-X-serine and asparagine-X-threonine, where X is any amino acid except proline, are the recognition sequences for enzymatic attachment of the carbohydrate moiety to the asparagine side chain. Thus, the presence of either of these tri-peptide sequences in a polypeptide creates a potential glycosylation site. O-linked glycosylation refers to the attachment of one of the sugars N-acetylgalactosamine, galactose, or xylose, to a hydroxyamino acid, most commonly serine or threonine, although 5-hydroxyproline or 5-hydroxylysine may also be used.

Addition of glycosylation sites to the antibody is conveniently accomplished by altering the amino acid sequence such that it contains one or more of the above-described tri-peptide sequences (for N-linked glycosylation sites). The alteration may also be made by the addition of or substitution by, one or more serine or threonine residues to the starting sequence (for O-linked glycosylation sites). For ease, the antibody amino acid sequence is preferably altered through changes at the DNA level, particularly by mutating the DNA encoding the target polypeptide at preselected bases such that codons are generated that will translate into the desired amino acids.

Another means of increasing the number of carbohydrate moieties on the antibody is by chemical or enzymatic coupling of glycosides to the protein. These procedures are advantageous in that they do not require production of the protein in a host cell that has glycosylation capabilities for N- and O-linked glycosylation. Depending on the coupling mode used, the sugar(s) may be attached to (a) arginine and histidine, (b) free carboxyl groups, (c) free sulfhydryl groups such as those of cysteine, (d) free hydroxyl groups such as those of serine, threonine, or hydroxyproline, (e) aromatic residues such as those of phenylalanine, tyrosine, or tryptophan, or (I) the amide group of glutamine. These methods are described in WO 87/05330 and in Aplin and Wriston, 1981, CRC Crit. Rev, Biochem., pp. 259-306, both entirely incorporated by reference.

Removal of carbohydrate moieties present on the starting antibody (e.g. post-translationally) may be accomplished chemically or enzymatically. Chemical deglycosylation requires exposure of the protein to the compound trifluoromethanesulfonic acid, or an equivalent compound. This treatment results in the cleavage of most or all sugars except the linking sugar (N-acetylglucosamine or N-acetylgalactosamine), while leaving the polypeptide intact. Chemical deglycosylation is described by Hakimuddin et al., 1987, Arch. Biochem. Biophys. 259:52 and by Edge et al., 1981, Anal. Biochem. 118:131, both entirely incorporated by reference. Enzymatic cleavage of carbohydrate moieties on polypeptides can be achieved by the use of a variety of endo- and exo-glycosidases as described by Thotakura et al., 1987, Meth. Enzymol. 138:350, entirely incorporated by reference. Glycosylation at potential glycosylation sites may be prevented by the use of the compound tunicamycin as described by Duskin et al., 1982, 0.1 Biol. Chem. 257:3105, entirely incorporated by reference. Tunicamycin blocks the formation of protein-N-glycoside linkages.

Another type of covalent modification of the antibody comprises linking the antibody to various nonproteinaceous polymers, including, but not limited to, various polyols such as polyethylene glycol, polypropylene glycol or polyoxyalkylenes, in the manner set forth in, for example, 2005-2006 PEG Catalog from Nektar Therapeutics (available at the Nektar website) U.S. Pat. Nos. 4,640,835; 4,496,689; 4,301,144; 4,670,417; 4,791,192 or 4,179,337, all entirely incorporated by reference. In addition, as is known in the art, amino acid substitutions may be made in various positions within the antibody to facilitate the addition of polymers such as PEG. See for example, U.S. Publication No. 2005/0114037A1, entirely incorporated by reference.

Specific CDR and Variable Region Embodiments

The present invention provides a number of antibodies each with a specific set of CDRs (including, as outlined above, some amino acid substitutions). As outlined above, the antibodies can be defined by sets of 6 CDRs, by variable regions, or by full-length heavy and light chains, including the constant regions. In addition, as outlined above, amino acid substitutions may also be made. In general, in the context of changes within CDRs, due to the relatively short length of the CDRs, the amino acid modifications are generally described in terms of the number of amino acid modifications that may be made. While this is also applicable to the discussion of the number of amino acid modifications that can be introduced in variable, constant or full-length sequences, in addition to number of changes, it is also appropriate to define these changes in terms of the "% identity". Thus, as described herein, antibodies included within the invention are 80, 85, 90, 95, 98 or 99% identical to the SEQ ID NOs listed herein.

In the context of the IgG418 antibody, the set of CDRs is as follows: the three CDRs of the heavy chain encompass HCDR1 SEQ ID NO:9 (HCDR1), SEQ ID NO: 13 (HCDR2), and SEQ ID NO: 17 (HCDR3), and the three CDRs of the light chain encompass SEQ ID NO: 25 (LCDR1), SEQ ID NO: 29 (LCDR2), and SEQ ID NO: 33 (LCDR3).

In some embodiments, antibodies that compete with the antibodies of the invention (for example, scFv418 or IgG418) for binding to human CD38 are provided. Competition for binding to CD38 or a portion of CD38 by two or more anti-CD38 antibodies may be determined by any suitable technique, as is known in the art.

Competition in the context of the present invention refers to any detectably significant reduction in the propensity of an antibody of the invention (e.g. IgG418) to bind its particular binding partner, e.g. CD38, in the presence of the test compound. Typically, competition means an at least about 10-100% reduction in the binding of an antibody of the invention to CD38 in the presence of the competitor, as measured by standard techniques such as ELISA or Biacore® assays. Thus, for example, it is possible to set criteria for competitiveness wherein at least about 10% relative inhibition is detected; at least about 15% relative inhibition is detected; or at least about 20% relative inhibition is detected before an antibody is considered sufficiently competitive. In cases where epitopes belonging to competing antibodies are closely located in an antigen, competition may be marked by greater than about 40% relative inhibition of CD38 binding (e.g., at least about 45% inhibition, such as at least about 50% inhibition, for instance at least about 55% inhibition, such as at least about 60% inhibition, for instance at least about 65% inhibition, such as at least about 70% inhibition, for instance at least about 75% inhibition, such as at least about 80% inhibition, for instance at least about 85% inhibition, such as at least about 90% inhibition, for instance at least about 95% inhibition, or higher level of relative inhibition).

In some cases, one or more of the components of the competitive binding assays are labeled, as discussed below in the context of diagnostic applications.

It may also be the case that competition may exist between anti-CD38 antibodies with respect to more than one of CD38 epitope, and/or a portion of CD38, e.g. in a context where the antibody-binding properties of a particular region of CD38 are retained in fragments thereof, such as in the case of a well-presented linear epitope located in various tested fragments or a conformational epitope that is presented in sufficiently large CD38 fragments as well as in CD38.

Assessing competition typically involves an evaluation of relative inhibitory binding using an antibody of the invention, CD38, and the test molecule. Test molecules can include any molecule, including other antibodies, small molecules, peptides, etc. The compounds are mixed in amounts that are sufficient to make a comparison that imparts information about the selectivity and/or specificity of the molecules at issue with respect to the other present molecules.

The amounts of test compound, CD38 and antibodies of the invention may be varied. For instance, for ELISA assessments about 5-50 µg (e.g., about 10-50 µg, about 20-50 µg, about 5-20 µg, about 10-20 µg, etc.) of the anti-CD38 antibody and/or CD38 targets are required to assess whether competition exists. Conditions also should be suitable for binding. Typically, physiological or near-physiological conditions (e.g., temperatures of about 20-40° C., pH of about 7-8, etc.) are suitable for anti-CD38:CD38 binding.

Often competition is marked by a significantly greater relative inhibition than about 5% as determined by ELISA and/or FACS analysis. It may be desirable to set a higher threshold of relative inhibition as a criteria/determinant of what is a suitable level of competition in a particular context (e.g., where the competition analysis is used to select or screen for new antibodies designed with the intended function of blocking the binding of another peptide or molecule binding to CD38 (e.g., the natural binding partners of CD38 such as CD31, also called CD31 antigen, EndoCAM, GPIIA, PECAM-1, platelet/endothelial cell adhesion molecule or naturally occurring anti-CD38 antibody).

In some embodiments, the anti-CD38 antibody of the present invention specifically binds to one or more residues or regions in CD38 but also does not cross-react with other proteins with homology to CD38, such as BST-1 (bone marrow stromal cell antigen-1) and Mo5, also called CD157.

Typically, a lack of cross-reactivity means less than about 5% relative competitive inhibition between the molecules when assessed by ELISA and/or FACS analysis using sufficient amounts of the molecules under suitable assay conditions.

Inhibition of CD38 Activity

The disclosed antibodies may find use in blocking a ligand-receptor interaction or inhibiting receptor component interaction. The anti-CD38 antibodies of the invention may be "blocking" or "neutralizing." A "neutralizing antibody" is intended to refer to an antibody whose binding to CD38 results in inhibition of the biological activity of CD38, for example its capacity to interact with ligands, enzymatic activity, signaling capacity and, in particular, it's ability to cause activated lymphocytes. Inhibition of the biological activity of CD38 can be assessed by one or more of several standard in vitro or in vivo assays known in the art.

"Inhibits binding" or "blocks binding" (for instance when referring to inhibition/blocking of binding of a CD38 binding partner to CD38) encompass both partial and complete inhibition/blocking. The inhibition/blocking of binding of a CD38 binding partner to CD38 may reduce or alter the normal level or type of cell signaling that occurs when a CD38 binding partner binds to CD38 without inhibition or blocking. Inhibition and blocking are also intended to include any measurable decrease in the binding affinity of a CD38 binding partner to CD38 when in contact with an anti-CD38 antibody, as compared to the ligand not in contact with an anti-CD38 antibody, for instance a blocking of binding of a CD38 binding partner to CD38 by at least about 10%, 20%, 30%, 40%, 50%, 60%, 70%, 80%, 90%, 99%, or 100%.

The disclosed anti-CD38 antibodies may also inhibit cell growth. "Inhibits growth" includes any measurable decrease in the cell growth when contacted with a an anti-CD38 antibody, as compared to the growth of the same cells not in contact with an anti-CD38 antibody, for instance an inhibition of growth of a cell culture by at least about 10%, 20%, 30%, 40%, 50%, 60%, 70%, 80%, 90%, 99%, or 100%.

In some embodiments, the disclosed anti-CD38 antibodies are able to deplete activated lymphocytes and plasma cells. "Depletion" in this context means a measurable decrease in serum levels (for example as tested in cyan monkeys) of activated lymphocytes and/or plasma cells as compared to untreated animals. In general, depletions of at least about 10%, 20%, 30%, 40%, 50%, 60%, 70%, 80%, 90%, 99%, or 100% are seen. As shown below in the Examples, in addition, one particular advantage that the antibodies of the present invention exhibit is the recoverability of these cells after dosing; that is, as is known for some treatments (for example with anti-CD20 antibodies for example), cell depletion can last for long periods of time, causing unwanted side effects. As shown herein, the effects on the activated lymphocytes and/or plasma cells are recoverable.

Methods for Producing the Antibodies of the Invention

The present invention further provides methods for producing the disclosed anti-CD38 antibodies. These methods encompass culturing a host cell containing isolated nucleic acid(s) encoding the antibodies of the invention. As will be appreciated by those in the art, this can be done in a variety of ways, depending on the nature of the antibody. In some embodiments, in the case where the antibodies of the invention are full length traditional antibodies, for example, a heavy chain variable region and a light chain variable region under conditions such that an antibody is produced and can be isolated.

In general, nucleic acids are provided that encode the antibodies of the invention. Such polynucleotides encode for both the variable and constant regions of each of the heavy and light chains, although other combinations are also contemplated by the present invention in accordance with the compositions described herein. The present invention also contemplates oligonucleotide fragments derived from the disclosed polynucleotides and nucleic acid sequences complementary to these polynucleotides.

The polynucleotides can be in the form of RNA or DNA. Polynucleotides in the form of DNA, cDNA, genomic DNA, nucleic acid analogs, and synthetic DNA are within the scope of the present invention. The DNA may be double-stranded or single-stranded, and if single stranded, may be the coding (sense) strand or non-coding (anti-sense) strand. The coding sequence that encodes the polypeptide may be identical to the coding sequence provided herein or may be a different coding sequence, which sequence, as a result of the redundancy or degeneracy of the genetic code, encodes the same polypeptides as the DNA provided herein.

In some embodiments, nucleic acid(s) encoding the antibodies of the invention are incorporated into expression vectors, which can be extrachromosomal or designed to integrate into the genome of the host cell into which it is introduced. Expression vectors can contain any number of appropriate regulatory sequences (including, but not limited to, transcriptional and translational control sequences, promoters, ribosomal binding sites, enhancers, origins of replication, etc.) or other components (selection genes, etc.), all of which are operably linked as is well known in the art. In some cases two nucleic acids are used and each put into a different expression vector (e.g. heavy chain in a first expression vector, light chain in a second expression vector), or alternatively they can be put in the same expression vector. It will be appreciated by those skilled in the art that the design of the expression vector(s), including the selection of regulatory sequences may depend on such factors as the choice of the host cell, the level of expression of protein desired, etc.

In general, the nucleic acids and/or expression can be introduced into a suitable host cell to create a recombinant host cell using any method appropriate to the host cell selected (e.g., transformation, transfection, electroporation, infection), such that the nucleic acid molecule(s) are operably linked to one or more expression control elements (e.g., in a vector, in a construct created by processes in the cell, integrated into the host cell genome). The resulting recombinant host cell can be maintained under conditions suitable for expression (e.g. in the presence of an inducer, in a suitable non-human animal, in suitable culture media supplemented with appropriate salts, growth factors, antibiotics, nutritional supplements, etc.), whereby the encoded polypeptide(s) are produced. In some cases, the heavy chains are produced in one cell and the light chain in another.

Mammalian cell lines available as hosts for expression are known in the art and include many immortalized cell lines available from the American Type Culture Collection (ATCC), Manassas, Va. including but not limited to Chinese hamster ovary (CHO) cells, HEK 293 cells, NSO cells, HeLa cells, baby hamster kidney (BHK) cells, monkey kidney cells (COS), human hepatocellular carcinoma cells (e.g., Hep G2), and a number of other cell lines. Non-mammalian cells including but not limited to bacterial, yeast, insect, and plants can also be used to express recombinant antibodies. In some embodiments, the antibodies can be produced in transgenic animals such as cows or chickens.

General methods for antibody molecular biology, expression, purification, and screening are described, for example, in Antibody Engineering, edited by Kontermann & Dubel, Springer, Heidelberg, 2001 and 2010 Hayhurst & Georgiou, 2001, Curr Opin Chem Biol 5:683-689; Maynard & Georgiou, 2000, Annu Rev Biomed Eng 2:339-76; and Morrison, S. (1985) Science 229:1202.

Applications and Indications

Once made, the antibodies of the invention find use in a variety of applications, including diagnosis of CD38-related diseases and treatment thereof.

CD38 Related Conditions

In one aspect, the invention provides methods of diagnosing and treating a condition associated with inflammation and immune diseases, particularly diseases associated with activated lymphocytes. As shown herein, CD38 is expressed in immature hematopoeitic cells, down regulated in mature cells, and re-expressed at high levels in activated lymphocytes and plasma cells. For example, high CD38 expression is seen in activated B cells, plasma cells, activated CD4+ T cells, activated CD8+ T cells, NK cells, NKT cells, mature dendritic cells (DCs) and activated monocytes.

The therapeutic anti-CD38 antibodies of the present invention bind to CD38 positive cells, resulting in depletion of these cells, such as activated lymphocytes, through multiple mechanisms of action, including CDC, ADCC and ADCP pathways.

Thus, any autoimmune disease that exhibits either increased expression of CD38 or increased numbers of CD38 expressing cells as a component of the disease may be treated using the antibodies of the invention. These include, but are not limited to systemic lupus erythematosus (SLE), rheumatoid arthritis (RA), Systemic Sclerosis (SSc), Multiple Sclerosis (MS), inflammatory bowel disease (IBD), ulcerative colitis, allogenic islet graft rejection, alopecia areata, ankylosing spondylitis, antiphospholipid syndrome, autoimmune Addison's disease, antineutrophil cytoplasmic autoantibodies (ANCA), autoimmune diseases of the adrenal gland, autoimmune hemolytic anemia, autoimmune hepatitis, autoimmune myocarditis, autoimmune neutropenia, autoimmune oophoritis and orchitis, autoimmune thrombocytopenia, autoimmune urticaria, Behcet's disease, bullous pemphigoid, cardiomyopathy, Castleman's syndrome, celiac spruce-dermatitis, chronic fatigue immune disfunction syndrome, chronic inflammatory demyelinating polyneuropathy, Churg-Strauss syndrome, cicatrical pemphigoid, CREST syndrome, cold agglutinin disease, Crohn's disease, dermatomyositis, discoid lupus, essential mixed cryoglobulinemia, factor VIII deficiency, fibromyalgia-fibromyositis, glomerulonephritis, Grave's disease, Guillain-Barre, Goodpasture's syndrome, graft-versus-host disease (GVHD), Hashimoto's thyroiditis, hemophilia A, idiopathic pulmonary fibrosis, idiopathic thrombocytopenia purpura (ITP), IgA neuropathy, IgM polyneuropathies, immune mediated thrombocytopenia, juvenile arthritis, Kawasaki's disease, lichen plantus, lupus erthematosis, Meniere's disease, mixed connective tissue disease, multiple sclerosis, type 1 diabetes mellitus, myasthenia gravis, pemphigus vulgaris, pernicious anemia, polyarteritis nodosa, polychrondritis, polyglandular syndromes, polymyalgia rheumatica, polymyositis and dermatomyositis, primary agammaglobinulinemia, primary biliary cirrhosis, psoriasis, psoriatic arthritis, Reynauld's phenomenon, Reiter's syndrome, rheumatoid arthritis, sarcoidosis, scleroderma, Sjorgen's syndrome, solid organ transplant rejection, stiff-man syndrome, systemic lupus erythematosus, takayasu arteritis, temporal arteristis/giant cell arteritis, thrombotic thrombocytopenia purpura, ulcerative colitis, uveitis, vasculitides such as dermatitis herpetiformis vasculitis, vitiligo, and Wegner's granulomatosis.

Of particular use in some embodiments are the use of the present antibodies for the use in the diagnosis and/or treatment of a number of diseases, including, but not limited to autoimmune diseases, including but not limited to systemic lupus erythematosus (SLE), rheumatoid arthritis (RA), Systemic Sclerosis (SSc), Multiple Sclerosis (MS), inflammatory bowel disease (IBD), diabetes, graft-v-host disease and ulcerative colitis.

Thus, for example, patients with high plasma cell content can be selected, such as SLE patients who exhibit high plasma cells, as well as RA patients shown to be unresponsive to CD20 based therapies.

In one aspect, the invention provides methods of treating a condition associated with proliferation of cells expressing CD38, comprising administering to a patient a pharmaceutically effective amount of a disclosed antibody. In certain embodiments, the condition is cancer, and in particular embodiments, the cancer is hematological cancer. In other particular embodiments, the condition is multiple myeloma, chronic lymphoblastic leukemia, chronic lymphocytic leukemia, plasma cell leukemia., acute myeloid leukemia, chronic myeloid leukemia, B-cell lymphoma, or Burkitt's lymphoma.

It is known in the art that certain conditions are associated with cells that express (CD38, and that certain conditions are associated with the overexpression, high-density expression, or upregulated expression of CD38 on the surfaces of cells. Whether a cell population expresses CD38 or not can be determined by methods known in the art, for example flow cytometric determination of the percentage of cells in a given population that are labelled by an antibody that specifically binds CD38 or immunohistochemical assays, as are generally described below for diagnostic applications. For example, a population of cells in which CD38 expression is detected in about 10-30% of the cells can be regarded as having weak positivity for CD38; and a population of cells in which CD38 expression is detected in greater than about 30% of the cells can be regarded as definite positivity for CD38 (as in Jackson et al. (1988), *Clin. Exp. Immunol.* 72: 351-356), though other criteria can be used to determine whether a population of cells expresses CD38. Density of expression on the surfaces of cells can be determined using methods known in the art, such as, for example, flow cytometric measurement of the mean fluorescence intensity of cells that have been fluorescently labelled using antibodies that specifically bind CD38.

In some embodiments, the compositions and methods of the invention are applied to a cancer such as a "hematologic cancer," a term that refers to malignant neoplasms of blood-forming tissues and encompasses leukemia, lymphoma and multiple myeloma. Non-limiting examples of conditions associated with CD38 expression include but are not limited to, multiple myeloma (Jackson et al. (1988), *Clin. Exp. Immunol.* 72: 351-356), B-cell chronic lymphocytic leukemia (B-CLL) Dürig et al. (2002), *Leukemia* 16: 30-5; Morabito et al. (2001), *Leukemia Research* 25: 927-32; Marinov et al. (1993), *Neoplasma* 40(6): 355-8; and Jelinek et al. (2001), *Br. J. Haematol.* 115: 854-61), acute lymphoblastic leukemia (Keyhani et al. (1999), *Leukemia Research* 24: 153-9; and Marinov et al. (1993), *Neoplasma* 40(6): 355-8), chronic myeloid leukemia (Marinov et al. (1993), *Neoplasma* 40(6): 355-8), acute myeloid leukemia (Keyhani et al. (1999), *Leukemia Research* 24: 153-9), chronic lymphocytic leukemia (CLL), chronic myelogenous leukemia or chronic myeloid leukemia (CML), acute myelogenous leukemia or acute myeloid leukemia (AML), acute lymphocytic leukemia (ALL), hairy cell leukemia (HCL), myelodysplastic syndromes (MDS) or chronic myelogenous leukemia (CML-BP) in blastic and all subtypes of these leukemias which are defined by morphological, histochemical and immunological techniques that are well known by those of skill in the art.

"Neoplasm" or "neoplastic condition" refers to a condition associated with proliferation of cells characterized by a loss of normal controls that results in one or more symptoms including, unregulated growth, lack of differentiation, local tissue invasion, and metastasis.

In some embodiments of the invention, the hematologic cancer is a selected from the group of Chronic Lymphocytic Leukemia (CLL), Chronic Myelogenous Leukemia (CML), Acute Myelogenous Leukemia (AML), and Acute Lymphocytic Leukemia (ALL).

Furthermore, it is known in the art that CD38 expression is a prognostic indicator for patients with conditions such as, for example, B-cell chronic lymphocytic leukemia (Dürig et al. (2002), *Leukemia* 16: 30-5; and Morabito et al. (2001), *Leukemia Research* 25: 927-32) and acute myelogenous leukemia (Keyhani et al. (1999), *Leukemia Research* 24: 153-9).

CLL is the most common leukemia of adults in the Western world. CLL involves clonal expansion of mature-appearing lymphocytes involving lymph nodes and other lymphoid tissues with progressive infiltration of bone marrow and presence in the peripheral blood. The B-cell form (B-CLL) represents almost all cases.

B-CLL

B-CLL is an incurable disease characterized by a progressive increase of anergic monoclonal B lineage cells that accumulate in the bone marrow and peripheral blood in a protracted fashion over many years. The expression of CD38 is regarded as an independent poor prognostic factor for B-CLL. Hamblin et al., Blood 99:1023-9 (2002).

Today's standard therapy of B-CLL is palliative and is mainly carried out with the cytostatic agent chlorambucil or fludarabine. When relapses occur, a combination therapy using fludarabine, cyclophosphamide in combination with rituximab (monoclonal antibody against CD20) or campath (monoclonal antibody against CD52) is often initiated. Thus, there is a critical unmet medical need for the treatment of B-CLL. In some embodiments, methods for treating B-CLL using the disclosed anti-CD38 antibodies are provided (and, as outlined below, this may be done using combination therapies including optionally and independently any of the above drugs).

B-CLL is characterized by two subtypes, indolent and aggressive. These clinical phenotypes correlate with the presence or absence of somatic mutations in the immunoglobulin heavy-chain variable region (IgVH) gene. As used herein, indolent B-CLL refers to a disorder in a subjects having mutated IgVH gene and/or presenting with one or more clinical phenotypes associated with indolent B-CLL. As used herein, the phrase aggressive B-CLL refers to a disorder in a subject having unmutated IgVH and/or presenting with one or more clinical phenotypes associated with aggressive B-CLL.

Multiple Myeloma

Multiple myeloma is a malignant disorder of the B cell lineage characterized by neoplastic proliferation of plasma cells in the bone marrow. Current treatment regimens exhibit moderate response rates. However, only marginal changes in overall survival are observed and the median survival is approximately 3 years. Thus, there is a critical unmet medical need for the treatment of multiple myeloma. In some embodiments, methods for treating multiple myeloma using the disclosed antibodies are provided.

CD38 is highly expressed on plasma cells which are terminally differentiated B cells.

Proliferation of myeloma cells causes a variety of effects, including lytic lesions (holes) in the bone, decreased red blood cell number, production of abnormal proteins (with attendant damage to the kidney, nerves, and other organs), reduced immune system function, and elevated blood calcium levels (hypercalcemia).

Currently treatment options include chemotherapy, preferably associated when possible with autologous stem cell transplantation (ASCT).

Monoclonal Gammopathy of Undetermined Significance and Smoldering Multiple Myeloma In some embodiments, methods for treating monoclonal gammopathy using the disclosed antibodies are provided. In other embodiments, methods for treating smoldering multiple myeloma using the disclosed antibodies are provided.

Monoclonal gammopathy of undetermined significance (MGUS) and smoldering multiple myeloma (SMM) are asymptomatic, pre-malignant disorders characterized by monoclonal plasma cell proliferation in the bone marrow and absence of end-organ damage.

Smoldering multiple myeloma (SMM) is an asymptomatic proliferative disorder of plasma cells with a high risk of progression to symptomatic, or active multiple myeloma (N. Engl. J. Med. 356(25): 2582-2590 (2007)).

International consensus criteria defining SMM were adopted in 2003 and require that a patient have a M-protein level of >30 g/L and/or bone marrow clonal plasma cells >10% (Br. J. Haematol. 121: 749-57 (2003)). The patient must have no organ or related tissue impairment, including bone lesions or symptoms (Br. J. Haematol. 121: 749-57 (2003)).

Recent studies have identified two subsets of SMM; i) patients with evolving. disease and ii) patients with non-evolving disease (Br. J. Haematol. 121: 631-636 (2003)). International consensus criteria defining MGUS require that a patient have a M-protein level of <30 g/L, bone marrow plasma cells <10% and the absence of organ or related tissue impairment, including bone lesions or symptoms (Br. J. Haematol. 121: 749-57 (2003)).

SMM resembles monoclonal gammopathy of undetermined significance (MGUS) as end-organ damage is absent (N. Engl. J. Med. 356(25): 2582-2590 (2007)). Clinically, however, SMM is far more likely to progress to active multiple myeloma or amyloidosis at 20 years (78% probability for SMM vs. 21% for MGUS) (N. Engl. J. Med. 356(25): 2582-2590 (2007)).

In addition, several other studies recently indicated that CD38 antibody therapy could abrogate the resistance of tumor cells to PD1/PDL1 therapy. Therefore, the anti-CD38 antibody of this invention finds diagnostic and therapeutic applications in the cancers not only limited to myeloma, but also all other kind of cancers by combination with PD1/PDL1 or other immune checkpoint targeted therapy.

Antibody Compositions for In Vivo Administration

Formulations of the antibodies used in accordance with the present invention are prepared for storage by mixing an antibody having the desired degree of purity with optional pharmaceutically acceptable carriers, excipients or stabilizers (Remington's Pharmaceutical Sciences 16th edition, Osol, A. Ed. [1980]), in the form of lyophilized formulations or aqueous solutions. Acceptable carriers, excipients, or stabilizers are nontoxic to recipients at the dosages and concentrations employed, and include buffers such as phosphate, citrate, and other organic acids; antioxidants including ascorbic acid and methionine; preservatives (such as octadecyldimethylbenzyl ammonium chloride; hexamethonium chloride; benzalkonium chloride, benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g. Zn-protein complexes); and/or non-ionic surfactants such as TWEEN™, PLURONICS™ or polyethylene glycol (PEG).

The formulation herein may also contain more than one active compound as necessary for the particular indication being treated, preferably those with complementary activities that do not adversely affect each other. For example, it may be desirable to provide antibodies with other specificities. Alternatively, or in addition, the composition may comprise a cytotoxic agent, cytokine, growth inhibitory agent and/or small molecule antagonist. Such molecules are suitably present in combination in amounts that are effective for the purpose intended.

The active ingredients may also be entrapped in microcapsules prepared, for example, by coacervation techniques or by interfacial polymerization, for example, hydroxymethylcellulose or gelatin-microcapsules and poly-(methylmethacylate) microcapsules, respectively, in colloidal drug delivery systems (for example, liposomes, albumin microspheres, microemulsions, nano-particles and nanocapsules) or in macroemulsions. Such techniques are disclosed in Remington's Pharmaceutical Sciences 16th edition, Osol, A. Ed. (1980).

The formulations to be used for in vivo administration should be sterile, or nearly so. This is readily accomplished by filtration through sterile filtration membranes.

Sustained-release preparations may be prepared. Suitable examples of sustained-release preparations include semipermeable matrices of solid hydrophobic polymers containing the antibody, which matrices are in the form of shaped articles, e.g. films, or microcapsules. Examples of sustained-release matrices include polyesters, hydrogels (for example, poly(2-hydroxyethyl-methacrylate), or poly(vinylalcohol)), polylactides (U.S. Pat. No. 3,773,919), copolymers of L-glutamic acid and .gamma. ethyl-L-glutamate, non-degradable ethylene-vinyl acetate, degradable lactic acid-glycolic acid copolymers such as the LUPRON DEPOT™ (injectable microspheres composed of lactic acid-glycolic acid copolymer and leuprolide acetate), and poly-D-(−)-3-hydroxybutyric acid. While polymers such as ethylene-vinyl acetate and lactic acid-glycolic acid enable release of molecules for over 100 days, certain hydrogels release proteins for shorter time periods.

When encapsulated antibodies remain in the body for a long time, they may denature or aggregate as a result of exposure to moisture at 37° C., resulting in a loss of biological activity and possible changes in immunogenicity. Rational strategies can be devised for stabilization depending on the mechanism involved. For example, if the aggregation mechanism is discovered to be intermolecular S—S bond formation through thio-disulfide interchange, stabilization may be achieved by modifying sulfhydryl residues, lyophilizing from acidic solutions, controlling moisture content, using appropriate additives, and developing specific polymer matrix compositions.

Administrative Modalities

The antibodies and chemotherapeutic agents of the invention are administered to a subject, in accord with known methods, such as intravenous administration as a bolus or by continuous infusion over a period of time, by intramuscular, intraperitoneal, intracerobrospinal, subcutaneous, intra-articular, intrasynovial, intrathecal, oral, topical, or inhalation routes. Intravenous or subcutaneous administration of the antibody is preferred.

Treatment Modalities

In the methods of the invention, therapy is used to provide a positive therapeutic response with respect to a disease or condition. By "positive therapeutic response" is intended an improvement in the disease or condition, and/or an improvement in the symptoms associated with the disease or condition. For example, a positive therapeutic response would refer to one or more of the following improvements in the disease: (1) a reduction in the number of neoplastic cells; (2) an increase in neoplastic cell death; (3) inhibition of neoplastic cell survival; (5) inhibition (i.e., slowing to some extent, preferably halting) of tumor growth; (6) an increased patient survival rate; and (7) some relief from one or more symptoms associated with the disease or condition.

Positive therapeutic responses in any given disease or condition can be determined by standardized response criteria specific to that disease or condition. Tumor response can be assessed for changes in tumor morphology (i.e., overall tumor burden, tumor size, and the like) using screening techniques such as magnetic resonance imaging (MRI) scan, x-radiographic imaging, computed tomographic (CT) scan, bone scan imaging, endoscopy, and tumor biopsy sampling including bone marrow aspiration (BMA) and counting of tumor cells in the circulation.

In addition to these positive therapeutic responses, the subject undergoing therapy may experience the beneficial effect of an improvement in the symptoms associated with the disease.

Thus for B cell tumors, the subject may experience a decrease in the so-called B symptoms, i.e., night sweats, fever, weight loss, and/or urticaria. For pre-malignant conditions, therapy with an anti-CD38 therapeutic agent may block and/or prolong the time before development of a related malignant condition, for example, development of multiple myeloma in subjects suffering from monoclonal gammopathy of undetermined significance (MGUS).

An improvement in the disease may be characterized as a complete response. By "complete response" is intended an absence of clinically detectable disease with normalization of any previously abnormal radiographic studies, bone marrow, and cerebrospinal fluid (CSF) or abnormal monoclonal protein in the case of myeloma.

Such a response may persist for at least 4 to 8 weeks, or sometimes 6 to 8 weeks, following treatment according to the methods of the invention. Alternatively, an improvement in the disease may be categorized as being a partial response. By "partial response" is intended at least about a 50% decrease in all measurable tumor burden (i.e., the number of malignant cells present in the subject, or the measured bulk of tumor masses or the quantity of abnormal monoclonal protein) in the absence of new lesions, which may persist for 4 to 8 weeks, or 6 to 8 weeks.

Treatment according to the present invention includes a "therapeutically effective amount" of the medicaments used. A "therapeutically effective amount" refers to an amount effective, at dosages and for periods of time necessary, to achieve a desired therapeutic result.

A therapeutically effective amount may vary according to factors such as the disease state, age, sex, and weight of the individual, and the ability of the medicaments to elicit a desired response in the individual. A therapeutically effective amount is also one in which any toxic or detrimental effects of the antibody or antibody portion are outweighed by the therapeutically beneficial effects.

A "therapeutically effective amount" for tumor therapy may also be measured by its ability to stabilize the progression of disease. The ability of a compound to inhibit cancer may be evaluated in an animal model system predictive of efficacy in human tumors.

Alternatively, this property of a composition may be evaluated by examining the ability of the compound to inhibit cell growth or to induce apoptosis by in vitro assays known to the skilled practitioner. A therapeutically effective amount of a therapeutic compound may decrease tumor size, or otherwise ameliorate symptoms in a subject. One of ordinary skill in the art would be able to determine such amounts based on such factors as the subject's size, the severity of the subject's symptoms, and the particular composition or route of administration selected.

Dosage regimens are adjusted to provide the optimum desired response (e.g., a therapeutic response). For example, a single bolus may be administered, several divided doses may be administered over time or the dose may be proportionally reduced or increased as indicated by the exigencies of the therapeutic situation. Parenteral compositions may be formulated in dosage unit form for ease of administration and uniformity of dosage. Dosage unit form as used herein refers to physically discrete units suited as unitary dosages for the subjects to be treated; each unit contains a predetermined quantity of active compound calculated to produce the desired therapeutic effect in association with the required pharmaceutical carrier.

The specification for the dosage unit forms of the present invention are dictated by and directly dependent on (a) the unique characteristics of the active compound and the particular therapeutic effect to be achieved, and (b) the limitations inherent in the art of compounding such an active compound for the treatment of sensitivity in individuals.

The efficient dosages and the dosage regimens for the anti-CD38 antibodies used in the present invention depend on the disease or condition to be treated and may be determined by the persons skilled in the art.

An exemplary, non-limiting range for a therapeutically effective amount of an anti-CD38 antibody used in the present invention is about 0.1-100 mg/kg, such as about 0, 1-50 mg/kg, for example about 0.1-20 mg/kg, such as about 0.1-10 mg/kg, for instance about 0.5, about such as 0.3, about 1, or about 3 mg/kg. In another embodiment, the antibody is administered in a dose of 1 mg/kg or more, such as a dose of from 1 to 20 mg/kg, e.g. a dose of from 5 to 20 mg/kg, e.g. a dose of 8 mg/kg.

A medical professional having ordinary skill in the art may readily determine and prescribe the effective amount of the pharmaceutical composition required. For example, a physician or a veterinarian could start doses of the medicament employed in the pharmaceutical composition at levels lower than that required in order to achieve the desired therapeutic effect and gradually increase the dosage until the desired effect is achieved.

In one embodiment, the anti-CD38 antibody is administered by infusion in a weekly dosage of from 10 to 500 mg/kg such as of from 200 to 400 mg/kg Such administration may be repeated, e.g., 1 to 8 times, such as 3 to 5 times. The administration may be performed by continuous infusion over a period of from 2 to 24 hours, such as of from 2 to 12 hours.

In one embodiment, the anti-CD38 antibody is administered by slow continuous infusion over a long period, such as more than 24 hours, if required to reduce side effects including toxicity.

In one embodiment the anti-CD38 antibody is administered in a weekly dosage of from 250 mg to 2000 mg, such as for example 300 mg, 500 mg, 700 mg, 1000 mg, 1500 mg or 2000 mg, for up to 8 times, such as from 4 to 6 times. The administration may be performed by continuous infusion over a period of from 2 to 24 hours, such as of from 2 to 12 hours. Such regimen may be repeated one or more times as necessary, for example, after 6 months or 12 months. The dosage may be determined or adjusted by measuring the amount of compound of the present invention in the blood upon administration by for instance taking out a biological sample and using anti-idiotypic antibodies which target the antigen binding region of the anti-CD38 antibody.

In a further embodiment, the anti-CD38 antibody is administered once weekly for 2 to 12 weeks, such as for 3 to 10 weeks, such as for 4 to 8 weeks.

In one embodiment, the anti-CD38 antibody is administered by maintenance therapy, such as, e.g., once a week for a period of 6 months or more.

In one embodiment, the anti-CD38 antibody is administered by a regimen including one infusion of an anti-CD38 antibody followed by an infusion of an anti-CD38 antibody conjugated to a radioisotope. The regimen may be repeated, e.g., 7 to 9 days later.

As non-limiting examples, treatment according to the present invention may be provided as a daily dosage of an antibody in an amount of about 0.1-100 mg/kg, such as 0.5, 0.9, 1.0, 1.1, 1.5, 2, 3, 4, 5, 6, 7, 8, 9, 10, 11, 12, 13, 14, 15, 16, 17, 18, 19, 20, 21, 22, 23, 24, 25, 26, 27, 28, 29, 30, 40, 45, 50, 60, 70, 80, 90 or 100 mg/kg, per day, on at least one of day 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40, or alternatively, at least one of week 1, 2, 3, 4, 5, 6, 7, 8, 9, 10, 11, 12, 13, 14, 15, 16, 17, 18, 19 or 20 after initiation of treatment, or any combination thereof, using single or divided doses of every 24, 12, 8, 6, 4, or 2 hours, or any combination thereof.

In some embodiments the anti-CD38 antibody molecule thereof is used in combination with one or more additional therapeutic agents, e.g. a chemotherapeutic agent. Non-limiting examples of DNA damaging chemotherapeutic agents include topoisomerase I inhibitors (e.g., irinotecan, topotecan, camptothecin and analogs or metabolites thereof, and doxorubicin); topoisomerase II inhibitors (e.g., etoposide, teniposide, and daunorubicin); alkylating agents (e.g., melphalan, chlorambucil, busulfan, thiotepa, ifosfamide, carmustine, lomustine, semustine, streptozocin, decarbazine, methotrexate, mitomycin C, and cyclophosphamide); DNA intercalators (e.g., cisplatin, oxaliplatin, and carboplatin); DNA intercalators and free radical generators such as bleomycin; and nucleoside mimetics (e.g., 5-fluorouracil, capecitabine, gemcitabine, fludarabine, cytarabine, mercaptopurine, thioguanine, pentostatin, and hydroxyurea).

Chemotherapeutic agents that disrupt cell replication include: paclitaxel, docetaxel, and related analogs; vincristine, vinblastin, and related analogs; thalidomide, lenalidomide, and related analogs (e.g., CC-5013 and CC-4047); protein tyrosine kinase inhibitors (e.g., imatinib mesylate and gefitinib); proteasome inhibitors (e.g., bortezomib); NF-κB inhibitors, including inhibitors of IκB kinase; antibodies which bind to proteins overexpressed in cancers and thereby downregulate cell replication (e.g., trastuzumab, rituximab, cetuximab, and bevacizumab); and other inhibitors of proteins or enzymes known to be upregulated, over-expressed or activated in cancers, the inhibition of which downregulates cell replication.

In some embodiments, the antibodies of the invention can be used prior to, concurrent with, or after treatment with Velcade® (bortezomib).

Diagnostic Uses

The anti-CD38 antibodies provided also find use in the in vitro or in vivo imaging of tumors or autoimmune disease states associated with CD38. In some embodiments, the antibodies described herein are used for both diagnosis and treatment, or for diagnosis alone.

In many embodiments, a diagnostic antibody is labeled. By "labeled" herein is meant that the antibodies disclosed herein have one or more elements, isotopes, or chemical compounds attached to enable the detection in a screen or diagnostic procedure. In general, labels fall into several classes: a) immune labels, which may be an epitope incorporated as a fusion partner that is recognized by an antibody, b) isotopic labels, which may be radioactive or heavy isotopes, c) small molecule labels, which may include fluorescent and colorimetric dyes, or molecules such as biotin that enable other labeling methods, and d) labels such as particles (including bubbles for ultrasound labeling) or paramagnetic labels that allow body imagining. Labels may be incorporated into the antibodies at any position and may be incorporated in vitro or in vivo during protein expression, as is known in the art.

Diagnosis can be done either in vivo, by administration of a diagnostic antibody that allows whole body imaging as described below, or in vitro, on samples removed from a patient. "Sample" in this context includes any number of things, including, but not limited to, bodily fluids (including, but not limited to, blood, urine, serum, lymph, saliva, anal and vaginal secretions, perspiration and semen), as well as tissue samples such as result from biopsies of relevant tissues.

In some embodiments, in vivo imaging is done, including but not limited to ultrasound, CT scans, X-rays, MRI and PET scans, as well as optical techniques, such as those using optical labels for tumors near the surface of the body.

In vivo imaging of diseases associated with CD38 may be performed by any suitable technique. For example, $^{99}$Tc-labeling or labeling with another β-ray emitting isotope may be used to label anti-CD38 antibodies. Variations on this technique may include the use of magnetic resonance imaging (MRI) to improve imaging over gamma camera techniques. Similar immunoscintigraphy methods and principles are described in, e.g., Srivastava (ed.), Radiolabeled Monoclonal Antibodies For Imaging And Therapy (Plenum Press 1988), Chase, "Medical Applications of Radioisotopes," in Remington's Pharmaceutical Sciences, 18th Edition, Gennaro et al., (eds.), pp. 624-652 (Mack Publishing Co., 1990), and Brown, "Clinical Use of Monoclonal Antibodies," in Biotechnology And Pharmacy 227-49, Pezzuto et al., (eds.) (Chapman & Hall 1993).

In one embodiment, the present invention provides an in vivo imaging method wherein an anti-CD38 antibody is conjugated to a detection-promoting agent, the conjugated antibody is administered to a host, such as by injection into the bloodstream, and the presence and location of the labeled antibody in the host is assayed. Through this technique and any other diagnostic method provided herein, the present invention provides a method for screening for the presence of disease-related cells in a human patient or a biological sample taken from a human patient.

For diagnostic imaging, radioisotopes may be bound to an anti-CD38 antibody either directly, or indirectly by using an intermediary functional group. Useful intermediary functional groups include chelators, such as ethylenediaminetetraacetic acid and diethylenetriaminepentaacetic acid (see for instance U.S. Pat. No. 5,057,313), in such diagnostic assays involving radioisotope-conjugated anti-CD38 antibodies, the dosage of conjugated anti-CD38 antibody delivered to the patient typically is maintained at as low a level as possible through the choice of isotope for the best combination of minimum half-life, minimum retention in the body, and minimum quantity of isotope, which will permit detection and accurate measurement.

In addition to radioisotopes and radio-opaque agents, diagnostic methods may be performed using anti-CD38 antibodies that are conjugated to dyes (such as with the biotin-streptavidin complex), contrast agents, fluorescent compounds or molecules and enhancing agents (e.g. paramagnetic ions) for magnetic resonance imaging (MRI) (see, e.g., U.S. Pat. No. 6,331,175, which describes MRI techniques and the preparation of antibodies conjugated to a MRI enhancing agent). Such diagnostic/detection agents may be selected from agents for use in magnetic resonance imaging, and fluorescent compounds.

In order to load an anti-CD38 antibody with radioactive metals or paramagnetic ions, it may be necessary to react it with a reagent having a long tail to which are attached a multiplicity of chelating groups for binding the ions. Such a tail may be a polymer such as a polylysine, polysaccharide, or other derivatized or derivatizable chain having pendant groups to which can be bound chelating groups such as, e.g., porphyrins, polyamines, crown ethers, bisthiosemicarbazones, polyoximes, and like groups known to be useful for this purpose.

Chelates may be coupled to anti-CD38 antibodies using standard chemistries. A chelate is normally linked to an anti-CD38 antibody by a group that enables formation of a bond to the molecule with minimal loss of immunoreactivity and minimal aggregation and/or internal cross-linking.

Examples of potentially useful metal-chelate combinations include 2-benzyl-DTPA and its monomethyl and cyclohexyl analogs, used with diagnostic isotopes in the general energy range of 60 to 4,000 keV, such as $^{125}$I, $^{123}$I, $^{124}$I, $^{62}$Cu, $^{64}$Cu, $^{18}$F, $^{111}$In, $^{67}$Ga, $^{99}$Tc, $^{94}$Tc, $^{11}$C, $^{13}$N, $^{5}$O, and $^{76}$Br, for radio-imaging.

Labels include a radionuclide, a radiological contrast agent, a paramagnetic ion, a metal, a fluorescent label, a chemiluminescent label, an ultrasound contrast agent and a photoactive agent. Such diagnostic agents are well known and any such known diagnostic agent may be used. Non-limiting examples of diagnostic agents may include a radionuclide such as $^{110}$In, $^{111}$In, $^{177}$Lu, $^{18}$F, $^{52}$Fe, $^{62}$Cu, $^{64}$Cu, $^{67}$Cu, $^{67}$Ga, $^{68}$Ga, $^{86}$Y, $^{90}$Y, $^{89}$Zr, $^{94}$mTc, $^{94}$Tc, $^{99}$mTc, $^{120}$I, $^{123}$I, $^{124}$I, $^{125}$I, $^{131}$I, $^{154-158}$Gd, $^{32}$P, $^{11}$C, $^{13}$N, $^{15}$O, $^{186}$Re, $^{188}$Re, $^{51}$Mn, $^{52}$mMn, $^{55}$Co, $^{72}$As, $^{75}$Br, $^{76}$Br, $^{82}$mRb, $^{83}$Sr, or other γ-, β-, or positron-emitters.

Paramagnetic ions of use may include chromium (III), manganese (II), iron (III), iron (II), cobalt (II), nickel (III), copper (III), neodymium (III), samarium (III), ytterbium (III), gadolinium (III), vanadium (II), terbium (III), dysprosium (III), holmium (III) or erbium (III), Metal contrast agents may include lanthanum (III), gold (III), lead (II) or bismuth (III).

Ultrasound contrast agents may comprise liposomes, such as gas filled liposomes. Radiopaque diagnostic agents may be selected from compounds, barium compounds, gallium compounds, and thallium compounds.

These and similar chelates, when complexed with non-radioactive metals, such as manganese, iron, and gadolinium may be useful for MRI diagnostic methods in connection with anti-CD38 antibodies. Macrocyclic chelates such as NOTA, DOTA, and TETA are of use with a variety of metals and radiometals, most particularly with radionuclides of gallium, yttrium, and copper, respectively. Such metal-chelate complexes may be made very stable by tailoring the ring size to the metal of interest. Other ring-type chelates such as macrocyclic polyethers, which are of interest for stably binding nuclides, such as 223Ra may also be suitable in diagnostic methods.

Thus, the present invention provides diagnostic anti-CD38 antibody conjugates, wherein the anti-CD38 antibody conjugate is conjugated to a contrast agent (such as for magnetic resonance imaging, computed tomography, or ultrasound contrast-enhancing agent) or a radionuclide that may be, for example, a γ-, β-, α-, Auger electron-, or positron-emitting isotope.

Anti-CD38 antibodies may also be useful in, for example, detecting expression of an antigen of interest in specific cells, tissues, or serum. For diagnostic applications, the antibody typically will be labeled with a detectable moiety for in vitro assays. As will be appreciated by those in the art, there are a wide variety of suitable labels for use in in vitro testing. Suitable dyes for use in this aspect of the invention include, but are not limited to, fluorescent lanthanide complexes, including those of Europium and Terbium, fluorescein, rhodamine, tetramethylrhodamine, eosin, erythrosin, coumarin, methyl-coumarins, quantum dots (also referred to as "nanocrystals"; see U.S. Ser. No. 09/315,584, hereby incorporated by reference), pyrene, Malacite green, stilbene, Lucifer Yellow, Cascade Blue™, Texas Red, Cy dyes (Cy3, Cy5, etc.), alexa dyes (including Alexa, phycoerythin, bodipy, and others described in the 6th Edition of the Molecular Probes Handbook by Richard P. Haugland, hereby expressly incorporated by reference.

Stained tissues may then be assessed for radioactivity counting as an indicator of the amount of CD38-associated peptides in the tumor. The images obtained by the use of such techniques may be used to assess biodistribution of CD38 in a patient, mammal, or tissue, for example in the context of using CD38 as a biomarker for the presence of invasive cancer cells.

Articles of Manufacture

In other embodiments, an article of manufacture containing materials useful for the treatment of the disorders described above is provided. The article of manufacture comprises a container and a label. Suitable containers include, for example, bottles, vials, syringes, and test tubes. The containers may be formed from a variety of materials such as glass or plastic. The container holds a composition which is effective for treating the condition and may have a sterile access port (for example the container may be an intravenous solution bag or a vial having a stopper pierceable by a hypodermic injection needle). The active agent in the composition is the antibody. The label on, or associated with, the container indicates that the composition is used for treating the condition of choice. The article of manufacture may further comprise a second container comprising a pharmaceutically-acceptable buffer, such as phosphate-buffered saline, Ringer's solution and dextrose solution. It may further include other materials desirable from a commercial and user standpoint, including other buffers, diluents, filters, needles, syringes, and package inserts with instructions for use.

EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

Example 1: Panning of Yeast Display Human scFv Library

The $1 \times 10^{11}$ yeast display naive human scFv library was constructed and the extracellular domain of human CD38 was purchased from ACRO biosystems. The method of library panning was previously described (Zhao et al., J Immunol Methods. 2011; 363(2):221-32.). Briefly, the recombinant biotinylated CD38-avi protein was incubated with induced yeast display scFv library; the CD38 binding yeast cells were isolated using streptavidin (SA) conjugated microbeads and then flowcytometry activated cell sorting (FACS). Identified scFv were engineered into full antibody and expressed by 293F cells.

Yeast Display scFv Library Panning Using Magnetic Beads

The yeast display scFv library was thawed from −80° C. and centrifugated at 3000 rpm for 5 minutes. The supernatant was discarded, and the yeast cells were resuspended with 12 L SD-CAA medium (one liter SD-CAA medium contains 5 g casamino acids, 1.7 g Yeast Nitrogen Base without ammonium $SO_4$ & amino acids, 5.3 g ammonium sulfade, 10.2 g $Na_2HPO_4 \cdot 7H_2O$, 8.6 g $NaH_2PO_4 \cdot H_2O$ and 20 g dextrose). The cells were cultured at 30° C. overnight with rocking at 200 rpm. The next day, yeast cells were harvested by centrifuging at 3000 rpm for 5 minutes and an appropriate amount was resuspended into 12 L S-CAA-GRD induction medium (one liter S-CAA-GRD medium contains 5 g casamino acids, 1.7 g Yeast Nitrogen Base without ammonium $SO_4$ & amino acids, 5.3 g ammonium sulfate, 10.2 g $Na_2HPO_4 \cdot 7H_2O$, 8.6 g $NaH_2PO_4 \cdot H_2O$, 1 g dextrose, 20 g galactose and 20 g raffinose) so that the final concentration was OD600=0.5 and induced at 20° C. overnight. Induced yeast cells were harvested by centrifugation at 3000 rpm for 5 minutes and washed twice by 2 L PBE buffer (PBE buffer is PBS buffer containing 2 mM EDTA and 0.5% BSA) and finally resuspended in 200 ml PBE. Cells were incubated with 40 mg biotinylated CD38 protein at room temperature (RT) for 1.5 hours and then 4° C. for 0.5 hour. The following steps were done at 4° C. or on ice. Cells were harvested by centrifuging at 3000 rpm for 5 minutes and washed twice with 2 L PBE and resuspended in 200 ml PBE. Then, 2 ml streptavidin microbeads (Miltenyi Biotec) was added to the cells and incubated with slow rocking for 1 hour. One liter PBE was added to cells, the solution was vortexed to make sure the cells were separated in single cells, and filtered using 70 mm strainer. CD38 binding yeast cells were isolated by AUTOMACS machine. The harvested cells were spread on SD-CAA plates and cultured for 2 days at 30° C. A total of $2.5 \times 10^7$ clones were obtained from the first round of magnetic sorting. Cells were scraped and induced for the second round of magnetic sorting. An aliquot was also stored in SD-CAA containing 10% glycerol at −80° C.

Yeast Display scFv Library Panning Using Flow Sorting

Yeast cells obtained from the magnetic sorting were further subjected to flow sorting. All the centrifugings were 3000 rpm for 5 minutes and all the steps were at 4° C. or on ice if not indicated otherwise. $2 \times 10^9$ cells isolated from the third magnetic sorting were induced in 100 ml S-CAA-GRD medium at 20° C. overnight, from which, $1 \times 10^8$ cells were taken for the first round flow sorting. Cells were pelleted and washed twice with 15 ml PBE and then resuspended in 1 ml PBE and incubated with 0.2 mg biotinylated CD38 protein at RT for 1.5 hours and then at 4° C. for half hour. Cells were washed three times with PBE and then incubated with 50 Streptavidin-PE (SA-PE) (BD biosciences) in 1 ml PBE at 4° C. for 1 hour in darkness. After staining, cells were washed three time with 15 ml PBE and resuspended in 1 ml PBE. CD38 binding yeast cells were sorted by flowcytometry. Sorted cells were allowed to grow on SD-CAA plates at 30° C. for 2 days.

Individual clones were picked and grew in 96 deep well plates and induced to express scFv. The individual clones were identified by flowcytometry for specific CD38 binding.

Example 2: Engineering of scFv418 to IgG418

Based on the V-base and IMGT database, the germline of heavy and light chains of scFv418 were identified and the signal peptides and constant regions were added to the variable regions to make up the gene that encode the full length peptides of heavy and light chains. The heavy and light chain genes were cloned into our in-house full antibody expression vector Lh1 and expressed by 293F cells and purified using Protein A affinity chromatography.

Example 3: Affinity Measurement of IgG418 by Capture ELISA

Affinity of IgG418 and Darzalex to CD38 recombinant protein was measured capture ELISA. Briefly, anti-human Fc antibody was coated on ELISA plates at the concentration of 10 μg/μl overnight at 4° ° C. Plates were washed twice with PBST, blocked with PBS™ 2 hours at RT and incubated with triplicate 4-fold serially diluted IgG418 from 50 nM down to 0.012 nM. Plate was washed 6 times with PBST and then incubated with 0.5 μg/ml biotinylated CD38-avi recombinant portion in PBS™ for 1 hour at RT. After 6 washes, plate was incubated with 1:1000 diluted streptavidin-HRP (BD Bioscience) in PBS™ at RT for 30 min. Plate was washed again for 6 times and incubated with TMB for 20 min at RT, colorimetric reaction was stopped with stop buffer and the absorbance was read at OD450. Affinities were calculated using GraphPad Prism software, which was Kd=1.64 nM for Darzalex and Kd=0.082 nM for IgG418 (FIG. 1). Table 1 shows the readings of ELISA.

TABLE 1 capture ELISA reading at OD450

| Ab Con. | IgG418 | Darzalex |
|---|---|---|
| 50 nM | 2.549 | 0.171 |
| 12.5 nM | 2.599 | 0.164 |
| 3.125 nM | 2.605 | 0.172 |
| 0.781 nM | 2.551 | 0.145 |
| 0.195 nM | 2.067 | 0.135 |
| 0.049 nM | 0.959 | 0.147 |
| 0.012 nM | 0.373 | 0.135 |
| 0 nM | 0.143 | 0.143 |

Example 4: Affinity Measurement of IgG418 by Flowcytometry

Affinity of IgG418 to the naturally conformational CD38 on cell surface was measured by flowcytometry on Daudi cells, with Darzalex as a control. Daudi cells were washed twice with PBS and incubated for 1 hour on ice with serially diluted antibodies in FACS buffer (PBS containing 2% FBS) as indicated in table 2. Cells were washed three times with PBS and incubated with 1:200 diluted anti-human IgG-Alexa647 in FACS buffer for 30 min at 4° C. in darkness. After three times wash with PBS, cells were analyzed using flowcytometer. Table 2 shows the antibody concentrations and mean fluorescence readings of each sample. Affinities were calculated using GraphPad Prism software, which was Kd=3.256 nM for Darzalex and Kd=3.1 nM for IgG418 (FIG. 2).

TABLE 2 affinity measurement by flowcytometry

| Ab con. | Mean fluorescence | |
|---|---|---|
| (nM) | Darzalex | IgG418 |
| 300 | 1292320 | 1347858 |
| 50 | 1307359 | 1295772 |
| 16.7 | 1340008 | 1284821 |
| 5.56 | 1085825 | 1085645 |
| 1.85 | 573531 | 557698 |
| 1.617 | 157851 | 257948 |
| 0.206 | 46682 | 82851 |
| 0.069 | 9321 | 31974 |

Example 5: Identify if IgG418 Binds the Same Epitope of Darzalex Using Competitive ELISA ELISA plate was coated with 2 μg/ml Darzalex, 50 μl/well in PBS overnight at 4° C. Then the plate was blocked with PBS™ for 2 hours at RT. Then ELISA wells were incubated with CD38 only or Ab-CD38 complexes that was prepared by pre-incubating Ab (15 μg/ml) and CD38 (0.2 μg/ml) for 1 hour at RT. After 30 min incubation at 4° C., plate was washed with PBST and was incubated with streptavidin-HRP for 30 min at RT. Plate was washed again for 6 times and incubated with TMB for 20 min at RT, colorimetric reaction was stopped with stop buffer and the absorbance was read at OD450. The competitive ELISA showed that IgG418 and Darzalex do not compete the binding site on CD38, therefore, their epitopes are different (FIG. 3).

Example 6: CDC Activity of IgG418

Figure 5:
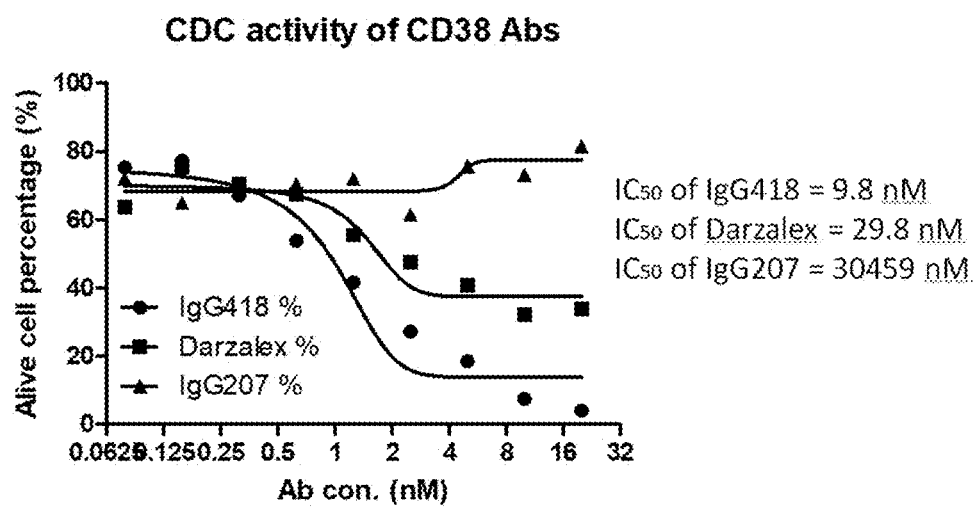
FIG. 5 shows the statistical analysis of CDC data.

Complement-dependent cytotoxicity (CDC) is one of the major mechanisms of antibody to kill antigen positive cells, such as tumor cells or pathogenic plasma cells. The CDC activities of IgG418 and Darzalex were analyzed as following: 2-fold serially dilute Abs in complete medium in 96 well plates from 20 nM, until around 0.078 nM, 100 μl/well. The surrounding wells are filled with 250 μl water to prevent evaporation. Put the plate into incubator to prewarm to reduce the clog when human serum added later. Thaw and centrifuge the human serum at 6000 rpm for 5 min to remove the clog. Dilute 1 volume human serum with 9 volume complete medium (10% serum, which is 2×) and use this 1:9 diluted human serum to resuspend Daudi cells with the density of $4 \times 10^4/100$ μl. Then add 100 μl of such cells into each well containing Abs (already in 100 μl medium, total volume is 200 μl) and incubate for 2 h at 37° C. Dilute 7AAD 10 times with complete medium, add 50 μl diluted 7AAD into each well, incubate for 5-10 in darkness. Transfer cells into 1.5 ml tube and run sample on Accuri C6 flowcytometer. FIG. 4 shows the CDC data by flowcytometry. Only P1 is live cells (7AAD negative), P2 is completely dead cells with all cytoplasm released so 7AAD is negative also (7AAD binds to DNA); P3 is freshly died cell with partial cytoplasm released so 7AAD is positive, therefore analyze the ratio of P1 to evaluate the CDC activity. FIG. 5 shows the statistic analysis of CDC data. The calculated $IC_{50}$ for IgG418, Darzalex and IgG207 are 9.8 nM, 29.8 nM and 30459 nM. IgG207 is a negative control antibody.

TABLE 3 data of CDC

| Ab con. (nM) | IgG418% | Darzalex % | IgG207% |
|---|---|---|---|
| 20 | 4.086845 | 33.9719 | 81.6092 |
| 10 | 7.535121 | 32.31162 | 73.18008 |
| 5 | 18.64623 | 40.86845 | 75.73436 |
| 2.5 | 27.33078 | 47.63729 | 61.55811 |
| 1.25 | 41.63474 | 55.55556 | 72.03065 |
| 0.625 | 53.89527 | 67.43295 | 70.49808 |
| 0.3125 | 67.17752 | 70.6258 | 68.58238 |
| 0.156 | 77.39464 | 75.2235 | 65.00639 |
| 0.078 | 75.35121 | 63.85696 | 72.15837 |

Example 7: Preparation of Afucosylated IgG418

The antibody-dependent cellular cytotoxicity (ADCC) is another important mechanism for an antibody to kill antigen positive cells. It has been well established in the field that antibody glycosylation on 297N affects the efficacy of ADCC. Afucosylated antibodies usually have 10-100-fold more enhanced ADCC activities. To further improve the ADCC activity, we have produced afucosylated IgG-418 (named IgG418 AF) in FUT8 knockout CHO-K1 cell line by Antagen Pharmaceuticals Inc.

Example 8: ADCC Activity of IgG418

Figure 6:
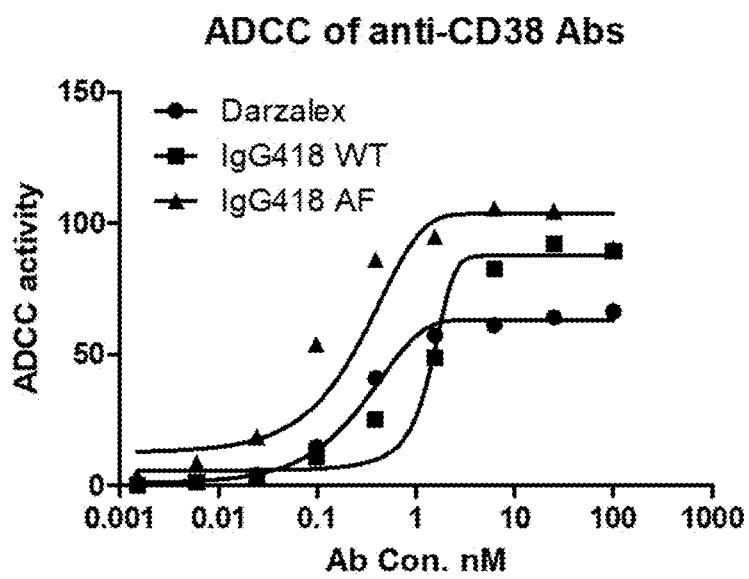
FIG. 6 depicts the ADCC activity of wild type and afucosylated IgG418 on Daudi cells using Darzalex as a control.

ADCC activities of Darzalex and wild type (WT) and afucosylated (AF) IgG418 were measured using engineered Jurkat cell line as effector cell developed by Antagen Pharmaceuticals with luciferase signal as the readout of ADCC activity. ADCC were performed on Daudi cells. Table 4 showed the antibody dilutions and the according luciferase readings. The results showed that Wild Type IgG418 (WT) has 1.4-fold higher maximal ADCC activity than Darzalex and the Afucosylated IgG418 (AF) has 1.6-fold higher maximal ADCC activity and around 10-fold lower $IC_{50}$ than Darzalex (Table 4 and FIG. 6)

TABLE 4

ADCC data

| Ab Con. (nM) | ADCC activity | | |
|---|---|---|---|
| | Darzalex | IgG418 WT | IgG418 AF |
| 100 | 66.47 | 89.14 | 90.32 |
| 25 | 64.12 | 92.15 | 104.70 |
| 6.25 | 61.04 | 82.39 | 105.56 |
| 1.56 | 57.17 | 48.81 | 94.83 |
| 0.39 | 40.89 | 25.06 | 86.06 |
| 0.098 | 14.74 | 10.76 | 53.85 |
| 0.0244 | 3.88 | 3.63 | 18.53 |
| 0.006 | 1.32 | 1.35 | 8.66 |
| 0.0015 | 0.12 | 0.038 | 3.42 |
| 0 | 0 | 0 | 0 |

Example 9: Inhibitory Effect of IgG418 on the Growth of Xenografts in SCID Mouse with Human B-Cell Lymphoma Daudi Cells CB-17 SCID mice, SPF grade, 16.6-21.5 g, male, were purchased from Beijing Charles River Laboratory Animal Technology Co., Ltd., Daudi cells (Nanjing Cobioer Biosciences Co., Ltd., Cat. No.: CBP60262) were cultured in 1640 complete medium (Hyclone, Cat. No.: SH30809.01) with 10% FBS (Hyclone, Cat. No.: SH30087.03), 100 U/mL penicillin and 100 µg/mL Streptomycin (Hyclone, Cat. No.: SV30010), and maintained in a 37° C. incubator with saturated humidity and 5% $CO_2$. Daudi cells in logarithmic growth phase were collected, resuspended in 1640 complete medium, and added with Matrigel at 1:1 to adjust the cell concentration to $2\times10^7$ cells/ml. Under sterile conditions, 0.1 ml of cell suspension was inoculated subcutaneously in the right back of SCID mice at a concentration of $2\times10^6$ cells/0.1 mL/mouse. 14 days after inoculation, animals with a tumor volume of about 100-200 mm³ were randomly divided into groups according to the tumor volume, 9 animals in each group, and the difference in tumor volume between the groups was less than 10% of the mean. The grouping day was recorded as Day 0, and there were 4 groups, respectively:

Group 1: Isotype control antibody (Isotype) (10 mg/kg)

Group 2: Darzalex (10 mg/kg) (JBS2Y20, Xi'an Janssen Pharmaceutical Co., Ltd.)

Group 3: IgG418-WT (10 mg/kg)

Group 4: IgG418-AF (10 mg/kg)

The experimental period was 31 days, during which the animal body weight and tumor volume were measured twice a week and the data were recorded. The clinical symptoms of the animals were observed and recorded once a day. After all the administrations, the mice were observed until the required time and then sacrificed to remove the tumors.

Figure 7:
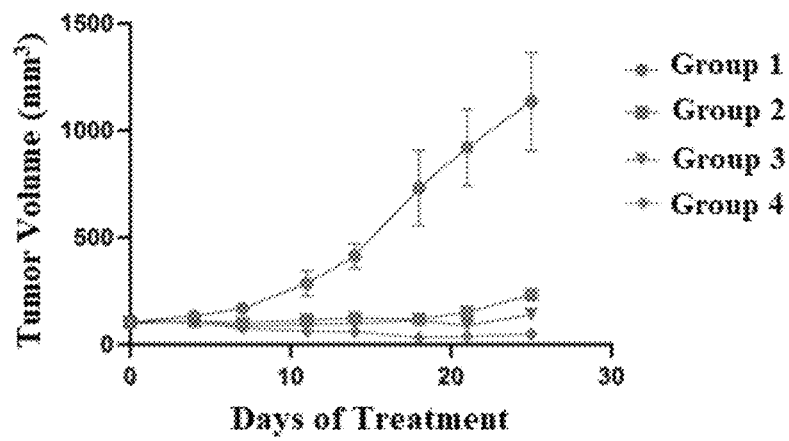
FIG. 7 depicts the inhibitory effect of anti-human CD38 monoclonal antibodies on the growth of xenografts in SCID mice with human B-cell lymphoma Daudi cells, administered at a dose of 10 mg/kg.

Tumor volume (TV) was calculated as: ½×a×b2, wherein a and b represent the measured length and width of the tumor, respectively. Relative tumor volume (RTV) was calculated as: Vt/Vo, wherein Vo represents the tumor volume at the time of grouping, and Vt represents the tumor volume at each measurement. Tumor growth inhibition (TGI) % was calculated as: (TWC−TWT)/TWC×100%, wherein TWC represents the average tumor weight of the negative control group, and TWT represents the average tumor weight of the treatment group. Graphing analysis (mean±SEM) was performed using Prism GraphPad graphing software, and P values between groups were obtained by using T-test for statistical analysis. $p<0.05$ was considered to have significant difference between groups, and $p<0.01$ was considered to have extremely significant difference between groups. The results are shown in Table 5 and FIG. 7.

TABLE 5

In vivo tumor inhibition of anti-CD38 monoclonal antibodies (dose: 10 mg/kg)

| Group and dose | Tumor volume (mm³) | Tumor growth inhibition (TGI) (%) |
|---|---|---|
| Isotype (10 mpk) | 1136.11 ± 229.12 | / |
| Darzalex (10 mpk) | 233.73 ± 26.54** | 79 |

TABLE 5-continued

In vivo tumor inhibition of anti-CD38 monoclonal antibodies (dose: 10 mg/kg)

| Group and dose | Tumor volume (mm³) | Tumor growth inhibition (TGI) (%) |
|---|---|---|
| IgG418-WT (10 mpk) | 141.24 ± 14.46** | 88 |
| IgG418-AF (10 mpk) | 49.16 ± 6.44** | 96 |

Note:
mpk means mg/kg;
**means $P < 0.01$ compared with Isotype.

The results of pharmacodynamic experiments in mice show that compared with the negative control Isotype, the humanized antibodies IgG418-AF and IgG418-WT of the present invention had significant inhibitory effects on xenografts of the human lymphoma Daudi cells in SCID mouse. Compared with the negative control Isotype (10 mg/kg) group, the IgG418-AF (10 mg/kg) group and the IgG418-WT (10 mg/kg) group at D21 of administration had tumor inhibition rates of 96% and 88%, respectively, which were significantly higher than that of the positive control Darzalex (10 mg/kg) group (TGI: 79%), indicating a better tumor inhibitory effect than that of Darzalex. During the experimental administration period, the body weight of animals in each group was not significantly different, suggesting that the antibody of the present invention had no obvious toxic and side effects.

Figure 8:
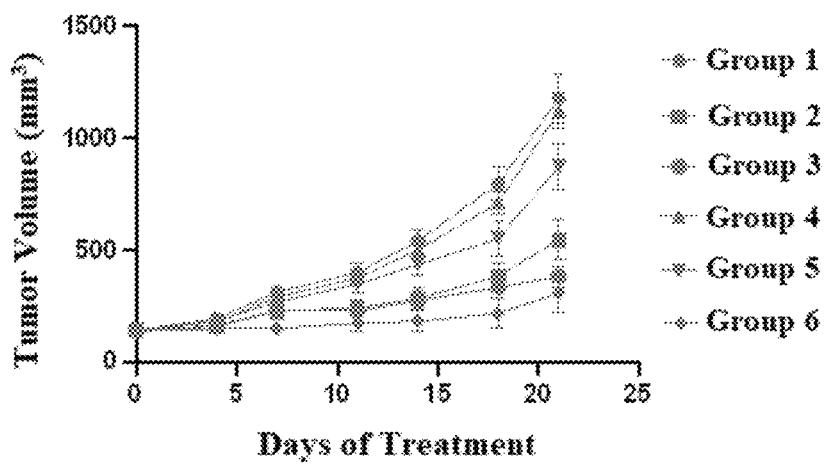
FIG. 8 depicts the inhibitory effect of anti-human CD38 monoclonal antibodies on the growth of xenografts in SCID mice with human B-cell lymphoma Daudi cells, administered at a dose of 1 mg/kg.

Example 10: Dose-Dependent Inhibitory Effect of IgG418 on the Growth of Xenografts in SCID Mouse with Human B-Cell Lymphoma Daudi Cells The experimental procedure and tumor measurement were the same as in Example 9.
Group 1: Isotype control antibody (Isotype) (1 mg/kg)
Group 2: Darzalex (1 mg/kg) (JBS2Y20, Xi'an Janssen Pharmaceutical Co., Ltd.),
Group 3: IgG418-WT (1 mg/kg)
Group 4: IgG418-AF (0.1 mg/kg)
Group 5: IgG418-AF (0.3 mg/kg)
Group 5: IgG418-AF (1 mg/kg)
The results are shown in Table 6 and FIG. 8.

TABLE 6

In vivo tumor inhibition of anti-CD38 monoclonal antibodies

| Group and dose | Tumor volume (mm³) | Tumor growth inhibition (TGI) (%) |
|---|---|---|
| Isotype (1 mpk) | 1178.9 ± 109.5 | / |
| Darzalex (1 mpk) | 544.8 ± 91.9** | 61 |
| IgG418-WT (1 mpk) | 379.6 ± 46.2** | 76 |
| IgG418-AF (0.1 mpk) | 1120.2 ± 76.3 | 6 |
| IgG418-AF (0.3 mpk) | 874.1 ± 102.2 | 29 |
| IgG418-AF (1 mpk) | 306.2 ± 89.8** | 84 |

Note:
mpk means mg/kg;
**means $P < 0.01$ compared with Isotype.

The results of pharmacodynamic experiments in mice show that compared with the negative control Isotype, the humanized antibodies IgG418-AF and IgG418-WT of the present invention had significant inhibitory effects on xenografts of the human lymphoma Daudi cells in SCID mouse. Compared with the negative control Isotype (1 mg/kg) group, the IgG418-AF (1 mg/kg) group and the IgG418-WT (1 mg/kg) group at D21 of administration had tumor inhibition rates of 76% and 84%, respectively, which were significantly higher than that of the positive control Darzalex (1 mg/kg) group (TGI: 61%), indicating a better tumor inhibitory effect than that of Darzalex. In addition, the tumor inhibitory effect of IgG418-AF administration groups showed a dose-dependent manner. During the experimental administration period, the body weight of animals in each group was not significantly different, suggesting that the antibody of the present disclosure had no obvious toxic and side effects.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

Sequence Listing
Human CD38:

SEQ ID NO: 1

MANCEFSPVSGDKPCCRLSRRAQLCLGVSILVLILVVVLAVVVPRWRQQW

SGPGTTKRFPETVLARCVKYTEIHPEMRHVDCQSVWDAFKGAFISKHPCN

ITEEDYQPLMKLGTQTVPCNKILLWSRIKDLAHQFTQVQRDMFTLEDTLL

GYLADDLTWCGEFNTSKINYQSCPDWRKDCSNNPVSVFWKTVSRRFAEAA

CDVVHVMLNGSRSKIFDKNSTFGSVEVHNLQPEKVQTLEAWVIHGGREDS

RDLCQDPTIKELESIISKRNIQFSCKNIYRPDKFLQCVKNPEDSSCTSEI

-continued scFv418 nucleic acid sequence

SEQ ID NO: 2

CAATCTGCCCTGACTCAGCCTGCCTCCGTGTCTGGGTCTCCTGGACAGTC

GATCACCATCTCCTGCACTGGAACCAGCAGTGACGTTGGTGGTTATAACT

ATGTCTCCTGGTACCAACAGCACCCAGGCAAAGCCCCCAAACTCGTAATT

TATGAGGGCACTCAGCGGCCCTCAGGGGTTTCTAGTCGCTTCTCTGGCTC

-continued

CAAGTCTGGCAACACGGCCTCCCTGACAATCTCTGGGCTCCAGGCTGAGG

ACGAGGCTGATTATTACTGCAGCTCATACACAAGCAGCAGTTTTTATGTC

TTCGGAACTGGGACCAAGCTGACCGTCCTAGTCGACGGTGGAGGTGGCAG

TGGAGGTGGCGGTTCTGGCGGTGGAGGTTCTGCTAGCCAGGTACAGCTGC

AGCAGTCAGGTCCAGGACTGGTGAAGCCCTCGCAGACCCTCTCACTCACC

TGTGCCATCTCCGGGGGCAGTGTCTCTAGCAACAGTGCTGCTTGGAACTG

GATCAGGCAGTCCCCATCGAGAGGCCTTGAGTGGCTGGGAAGGACATACT

ACAGGTCCAAGTGGTATAATGATTATGCAGTATCTGTGAAAAGTCGAATA

ACCATCAACCCAGACACATCCAAGAACCAGTTCTCCCTGCAGCTGAACTC

TGTGACTCCCGAGGACACGGCTGTGTATTACTGTGCAAGAGATGCGCTAG

CAGCAGCTGGTACATATGGTTACTACTACTACTACGGTATGGACGTCTGG

GGCCAAGGGACAATGGTCACCGTCTCTTCA scFv418 amino acid sequence
SEQ ID NO: 3

QSALTQPASVSGSPGQSITISCTGTSSDVGGYNYVSWYQQHPGKAPKLVI

YEGTQRPSGVSSRFSGSKSGNTASLTISGLQAEDEADYYCSSYTSSSFYV

FGTGTKLTVLVDGGGSGGGGSGGGGSASQVQLQQSGPGLVKPSQTLSLT

CAISGGSVSSNSAAWNWIRQSPSRGLEWLGRTYYRSKWYNDYAVSVKSRI

TINPDTSKNQFSLQLNSVTPEDTAVYYCARDALAAAGTYGYYYYGMDVW

GQGTMVTVSS scFv418 VH nucleic acid sequence
SEQ ID NO: 4

CAGGTACAGCTGCAGCAGTCAGGTCCAGGACTGGTGAAGCCCTCGCAGAC

CCTCTCACTCACCTGTGCCATCTCCGGGGGCAGTGTCTCTAGCAACAGTG

CTGCTTGGAACTGGATCAGGCAGTCCCCATCGAGAGGCCTTGAGTGGCTG

GGAAGGACATACTACAGGTCCAAGTGGTATAATGATTATGCAGTATCTGT

GAAAAGTCGAATAACCATCAACCCAGACACATCCAAGAACCAGTTCTCCC

TGCAGCTGAACTCTGTGACTCCCGAGGACACGGCTGTGTATTACTGTGCA

AGAGATGCGCTAGCAGCAGCTGGTACATATGGTTACTACTACTACTACGG

TATGGACGTCTGGGGCCAAGGGACAATGGTCACCGTCTCTTCA scFv418 VH amino acid sequence
SEQ ID NO: 5

QVQLQQSGPGLVKPSQTLSLTCAISGGSVSSNSAAWNWIRQSPSRGLEWL

GRTYYRSKWYNDYAVSVKSRITINPDTSKNQFSLQLNSVTPEDTAVYYCA

RDALAAAGTYGYYYYGMDVWGQGTMVTVSS scFv418 VH frame region 1 (FR1) nucleic acid
sequence
SEQ ID NO: 6
CAGGTACAGCTGCAGCAGTCAGGTCCAGGACTGGTGAAGCCCTCGCAGAC

CCTCTCACTCACCTGTGCCATCTCC scFv418 VH frame region 1 (FR1) amino acid
sequence
SEQ ID NO: 7
QVQLQQSGPGLVKPSQTLSLTCAIS scFv418 VH CDR1 nucleic acid sequence
SEQ ID NO: 8
GGGGGCAGTGTCTCTAGCAACAGTGCTGCT scFv418 VH CDR1 amino acid sequence
SEQ ID NO: 9
GGSVSSNSAA scFv418 VH frame region 2 (FR2) nucleic acid
sequence
SEQ ID NO: 10
TGGAACTGGATCAGGCAGTCCCCATCGAGAGGCCTTGAGTGGCTGGGAAG

G scFv418 VH frame region 2 (FR2) amino acid
sequence
SEQ ID NO: 11

WNWIRQSPSRGLEWLGR scFv418 VH CDR2 region nucleic acid sequence
SEQ ID NO: 12
ACATACTACAGGTCCAAGTGGTATAAT scFv418 VH CDR2 region amino acid sequence
SEQ ID NO: 13
TYYRSKWYN scFv418 VH frame region 3 (FR3) nucleic acid
sequence
SEQ ID NO: 14
GATTATGCAGTATCTGTGAAAAGTCGAATAACCATCAACCCAGACACATC

CAAGAACCAGTTCTCCCTGCAGCTGAACTCTGTGACTCCCGAGGACACGG

CTGTGTATTACTGT scFv418 VH frame region 3 (FR3) amino acid
sequence
SEQ ID NO: 15
DYAVSVKSRITINPDTSKNQFSLQLNSVTPEDTAVYYC scFv418 VH CDR3 region nucleic acid sequence
SEQ ID NO: 16
GCAAGAGATGCGCTAGCAGCAGCTGGTACATATGGTTACTACTACTACTA

CGGTATGGACGTC scFv418 VH CDR3 region amino acid sequence
SEQ ID NO: 17
ARDALAAAGTYGYYYYYGMDV scFv418 VH frame region 4 (FR4) nucleic acid
sequence
SEQ ID NO: 18
TGGGGCCAAGGGACAATGGTCACCGTCTCTTCA scFv418 VH frame region 4 (FR4) amino acid
sequence
SEQ ID NO: 19

WGQGTMVTVSS scFv418 VL nucleic acid sequence
SEQ ID NO: 20
CAATCTGCCCTGACTCAGCCTGCCTCCGTGTCTGGGTCTCCTGGACAGTC

GATCACCATCTCCTGCACTGGAACCAGCAGTGACGTTGGTGGTTATAACT

ATGTCTCCTGGTACCAACAGCACCCAGGCAAAGCCCCCAAACTCGTAATT

TATGAGGGCACTCAGCGGCCCTCAGGGGTTTCTAGTCGCTTCTCTGGCTC

CAAGTCTGGCAACACGGCCTCCCTGACAATCTCTGGGCTCCAGGCTGAGG

ACGAGGCTGATTATTACTGCAGCTCATACACAAGCAGCAGTTTTTATGTC

TTCGGAACTGGGACCAAGCTGACCGTCCTA scFv418 VL amino acid sequence
SEQ ID NO: 21
QSALTQPASVSGSPGQSITISCTGTSSDVGGYNYVSWYQQHPGKAPKLVI

YEGTQRPSGVSSRFSGSKSGNTASLTISGLQAEDEADYYCSSYTSSSFYV

FGTGTKLTVL scFv418 VL frame region 1 (FR1) nucleic acid sequence
SEQ ID NO: 22
CAATCTGCCCTGACTCAGCCTGCCTCCGTGTCTGGGTCTCCTGGACAGTC

GATCACCATCTCCTGCACTGGAACC scFv418 VL frame region 1 (FR1) amino acid sequence
SEQ ID NO: 23
QSALTQPASVSGSPGQSITISCTGT scFv418 VL CDR1 nucleic acid sequence
SEQ ID NO: 24
AGCAGTGACGTTGGTGGTTATAACTAT scFv418 VL CDR1 amino acid sequence
SEQ ID NO: 25
SSDVGGYNY scFv418 VL frame region 2 (FR2) nucleic acid sequence
SEQ ID NO: 26
GTCTCCTGGTACCAACAGCACCCAGGCAAAGCCCCCAAACTCGTAATTTA
T scFv418 VL frame region 2 (FR2) amino acid sequence
SEQ ID NO: 27
VSWYQQHPGKAPKLVIY scFv418 VL CDR2 nucleic acid sequence
SEQ ID NO: 28
GAGGGCACT scFv418 VL CDR2 amino acid sequence
SEQ ID NO: 29
EGT scFv418 VL frame region 3 (FR3) nucleic acid sequence
SEQ ID NO: 30
CAGCGGCCCTCAGGGGTTTCTAGTCGCTTCTCTGGCTCCAAGTCTGGCAA

CACGGCCTCCCTGACAATCTCTGGGCTCCAGGCTGAGGACGAGGCTGATT

ATTACTGC scFv418 VL frame region 3 (FR3) amino acid sequence
SEQ ID NO: 31
QRPSGVSSRFSGSKSGNTASLTISGLQAEDEADYYC scFv418 VL CDR3 region nucleic acid sequence
SEQ ID NO: 32
AGCTCATACACAAGCAGCAGTTTTTATGTC scFv418 VL CDR3 region amino acid sequence
SEQ ID NO: 33
SSYTSSSFYV scFv418 VL frame region 4 (FR4) nucleic acid sequence
SEQ ID NO: 34
TTCGGAACTGGGACCAAGCTGACCGTCCTA scFv418 VL frame region 4 (FR4) amino acid sequence
SEQ ID NO: 35
FGTGTKLTVL IgG418 heavy chain nucleic acid sequence
SEQ ID NO: 36
CAGGTACAGCTGCAGCAGTCAGGTCCAGGACTGGTGAAGCCCTCGCAGAC

CCTCTCACTCACCTGTGCCATCTCCGGGGGCAGTGTCTCTAGCAACAGTG

CTGCTTGGAACTGGATCAGGCAGTCCCCATCGAGAGGCCTTGAGTGGCTG

GGAAGGACATACTACAGGTCCAAGTGGTATAATGATTATGCAGTATCTGT

GAAAAGTCGAATAACCATCAACCCAGACACATCCAAGAACCAGTTCTCCC

TGCAGCTGAACTCTGTGACTCCCGAGGACACGGCTGTGTATTACTGTGCA

AGAGATGCGCTAGCAGCAGCTGGTACATATGGTTACTACTACTACTACGG

TATGGACGTCTGGGGCCAAGGGACAATGGTCACCGTCTCTTCAGCCTCCA

CTAAGGGCCCATCCGTGTTCCCACTGGCACCCTCTAGTAAGAGCACATCT

GGGGGTACTGCCGCTCTGGGATGTCTGGTGAAGGATTACTTCCCAGAGCC

AGTCACCGTGTCCTGGAACAGCGGGGCCCTGACTTCCGGTGTCCATACCT

TTCCAGCTGTGCTGCAGTCATCCGGCCTGTACAGCCTGAGCTCTGTGGTC

ACCGTCCCCAGTTCATCCCTGGGAACACAGACTTATATCTGCAACGTGAA

TCACAAGCCATCCAATACAAAAGTCGACAAGAAAGTGGAACCCAAGAGCT

GTGATAAAACCCATACATGCCCCCCTTGTCCTGCTCCAGAGCTGCTGGGA

GGACCATCCGTGTTCCTGTTTCCACCCAAGCCTAAAGACACTCTGATGAT

TTCTCGAACCCCCGAAGTCACATGCGTGGTCGTGGACGTGTCCCACGAGG

ATCCTGAAGTCAAGTTCAACTGGTACGTGGATGGCGTCGAGGTGCATAAT

GCCAAGACAAAACCACGAGAGGAACAGTACAACAGTACCTATCGTGTCGT

GTCAGTCCTGACAGTGCTGCACCAGGACTGGCTGAACGGGAAGGAATATA

AGTGCAAAGTGAGCAATAAGGCACTGCCCGCCCCTATCGAGAAAACAATT

TCTAAGGCTAAAGGACAGCCTAGGGAACCACAGGTGTACACTCTGCCTCC

ATCACGGGACGAGCTGACAAAGAACCAGGTCAGTCTGACTTGTCTGGTGA

AAGGGTTCTATCCTTCTGATATCGCCGTGGAGTGGGAAAGTAATGGTCAG

CCAGAGAACAATTACAAGACCACACCCCCTGTCCTGGACTCTGATGGGAG

TTTCTTTCTGTATTCCAAGCTGACCGTGGATAAAAGCCGGTGGCAGCAGG

GTAATGTCTTTAGTTGTTCAGTGATGCACGAGGCACTGCACAATCACTAC

ACCCAGAAATCACTGTCACTGTCACCAGGTAAATGA

IgG418 heavy chain amino acid sequence
SEQ ID NO: 37
QVQLQQSGPGLVKPSQTLSLTCAISGGSVSSNSAAWNWIRQSPSRGLEWL

GRTYYRSKWYNDYAVSVKSRITINPDTSKNQFSLQLNSVTPEDTAVYYCA

RDALAAAGTYGYYYYYGMDVWGQGTMVTVSSASTKGPSVFPLAPSSKSTS

GGTAALGCLVKDYFPEPVTVSWNSGALTSGVHTFPAVLQSSGLYSLSSVV

TVPSSSLGTQTYICNVNHKPSNTKVDKKVEPKSCDKTHTCPPCPAPELLG

GPSVFLFPPKPKDTLMISRTPEVTCVVVDVSHEDPEVKFNWYVDGVEVHN

AKTKPREEQYNSTYRVVSVLTVLHQDWLNGKEYKCKVSNKALPAPIEKTI

-continued

SKAKGQPREPQVYTLPPSRDELTKNQVSLTCLVKGFYPSDIAVEWESNGQ

PENNYKTTPPVLDSDGSFFLYSKLTVDKSRWQQGNVFSCSVMHEALHNHY

TQKSLSLSPGK

IgG418 heavy chain signal peptide nucleic acid
sequence
                                        SEQ ID NO: 38
ATGTCTGTCTCCTTCCTCATCTTCCTGCCCGTGCTGGGCCTCCCATGGGG

TGTCCTGTCA

IgG418 heavy chain signal peptide amino acid
sequence
                                        SEQ ID NO: 39
MSVSFLIFLPVLGLPWGVLS IgG418 light chain nucleic acid sequence
                                        SEQ ID NO: 40
CAATCTGCCCTGACTCAGCCTGCCTCCGTGTCTGGGTCTCCTGGACAGTC

GATCACCATCTCCTGCACTGGAACCAGCAGTGACGTTGGTGGTTATAACT

ATGTCTCCTGGTACCAACAGCACCCAGGCAAAGCCCCCAAACTCGTAATT

TATGAGGGCACTCAGCGGCCCTCAGGGGTTTCTAGTCGCTTCTCTGGCTC

CAAGTCTGGCAACACGGCCTCCCTGACAATCTCTGGGCTCCAGGCTGAGG

ACGAGGCTGATTATTACTGCAGCTCATACACAAGCAGCAGTTTTTATGTC

TTCGGAACTGGGACCAAGCTGACCGTCCTAGGtCAGCCtAAGGCtGCTCC

TAGCGTGACCCTGTTCCCTCCCAGCAGCGAGGAGCTGCAGGCAAACAAAG

CCACCCTGGTGTGCCTGATCTCCGACTTTTACCCTGGCGCCGTGACAGTG

GCCTGGAAGGCTGACAGCAGCCCAGTGAAAGCCGGAGTGGAGACCACCAC

CCCCTCCAAGCAGTCCAACAACAAGTACGCCGCATCCTCCTACCTGAGCC

TGACCCCCGAGCAGTGGAAGTCCCACAGGTCCTACTCCTGCCAGGTGACC

CACGAGGGCTCTACCGTGGAAAAGACCGTGGCCCCCACCGAGTGCTCCTG

A

IgG418 light chain amino acid sequence
                                        SEQ ID NO: 41
QSALTQPASVSGSPGQSITISCTGTSSDVGGYNYVSWYQQHPGKAPKLVI

YEGTQRPSGVSSRFSGSKSGNTASLTISGLQAEDEADYYCSSYTSSSFYV

FGTGTKLTVLGQPKAAPSVTLFPPSSEELQANKATLVCLISDFYPGAVTV

AWKADSSPVKAGVETTTPSKQSNNKYAASSYLSLTPEQWKSHRSYSCQVT

HEGSTVEKTVAPTECS

IgG418 light chain signal peptide nucleic acid
sequence
                                        SEQ ID NO: 42
ATGGCCTGGGCTCTGCTGCTCCTCACCCTCCTCACTCAGGGCACAGGGTC

CTGGGCC

IgG418 light chain signal peptide amino acid
sequence
                                        SEQ ID NO: 43
MAWALLLLTLLTQGTGSWA

What is claimed is:

1. A composition comprising an antibody or antibody fragment thereof, wherein the antibody or antibody fragment thereof comprises one or more of:
   a) a light chain variable region FR1 comprising an amino acid sequence selected from the group consisting of the amino acid sequence of SEQ ID NO: 23, and an amino acid sequence having greater than about 90% homology to SEQ ID NO: 23;
   b) a light chain CDR1 comprising an amino acid sequence selected from the group consisting of the amino acid sequence of SEQ ID NO: 25, and an amino acid sequence having greater than about 90% homology to SEQ ID NO: 25;
   c) a light chain variable region FR2 comprising an amino acid sequence selected from the group consisting of SEQ ID NO: 27, an amino acid sequence having greater than about 90% homology to SEQ ID NO: 27;
   d) a light chain CDR2 comprising an amino acid sequence selected from the group consisting of SEQ ID NO: 29, an amino acid sequence having greater than about 90% homology to SEQ ID NO: 29;
   e) a light chain variable region FR3 comprising an amino acid sequence selected from the group consisting of the amino acid sequence of SEQ ID NO: 31, and an amino acid sequence having greater than about 90% homology to SEQ ID NO: 31;
   f) a light chain CDR3 comprising an amino acid sequence selected from the group consisting of the amino acid sequence of SEQ ID NO: 33, and an amino acid sequence having greater than about 90% homology to SEQ ID NO: 33;
   g) a light chain variable region FR4 comprising an amino acid sequence selected from the group consisting of SEQ ID NO: 35, an amino acid sequence having greater than about 90% homology to SEQ ID NO: 35;
   h) a heavy chain variable region FR1 comprising an amino acid sequence selected from the group consisting of the amino acid sequence of SEQ ID NO: 7, and an amino acid sequence having greater than about 90% homology to SEQ ID NO: 7;
   i) a heavy chain CDR1 comprising an amino acid sequence selected from the group consisting of SEQ ID NO: 9, an amino acid sequence having greater than about 90% homology to SEQ ID NO: 9;
   j) a heavy chain variable region FR2 comprising an amino acid sequence selected from the group consisting of the amino acid sequence of SEQ ID NO: 11, and an amino acid sequence having greater than about 90% homology to SEQ ID NO: 11;
   k) a heavy chain CDR2 comprising an amino acid sequence selected from the group consisting of the amino acid sequence of SEQ ID NO: 13, and an amino acid sequence having greater than about 90% homology to SEQ ID NO: 13;
   l) A heavy chain variable region FR3 comprising an amino acid sequence selected from the group consisting of SEQ ID NO: 15, an amino acid sequence having greater than about 90% homology to SEQ ID NO: 15;
   m) a heavy chain CDR3 comprising an amino acid sequence selected from the group consisting of SEQ ID NO: 17, an amino acid sequence having greater than about 90% homology to SEQ ID NO: 17; and
   n) a heavy chain variable region FR4 comprising an amino acid sequence selected from the group consisting of SEQ ID NO: 19, an amino acid sequence having greater than about 90% homology to SEQ ID NO: 19.

2. The composition of claim 1, wherein the antibody or antibody fragment thereof comprises a heavy chain variable region and a light chain variable region,
   the heavy chain variable region comprises a complementary determining region 1 (CDR1), a complementary determining region 2 (CDR2) and a complementary determining region 3 (CDR3) of the heavy chain variable region, the CDR1, CDR2 and CDR3 of the heavy chain variable region comprise an amino acid sequence selected from the group consisting of SEQ ID NO: 9, 13, 17 and an amino acid sequence having at least 90% homology with SEQ ID NO: 9, 13 and 17; and
   the light chain variable region comprises a complementary determining region 1 (CDR1), a complementary determining region 2 (CDR2) and a complementary determining region 3 (CDR3) of the light chain variable region, the CDR1, CDR2 and CDR3 of the light chain variable region comprise an amino acid sequence selected from the group consisting of SEQ ID NO: 25, 29, 33 and an amino acid sequence having at least 90% homology with SEQ ID NO: 25, 29 and 33.

3. The composition of claim 2, wherein:
   the CDR1 of the heavy chain variable region comprises an amino acid sequence set forth in SEQ ID NO: 9, the CDR2 of the heavy chain variable region comprises an amino acid sequence set forth in SEQ ID NO: 13, and the CDR3 of the heavy chain variable region comprises an amino acid sequence set forth in SEQ ID NO: 17; and
   the CDR1 of the light chain variable region comprises an amino acid sequence set forth in SEQ ID NO: 25, the CDR2 of the light chain variable region comprises an amino acid sequence set forth in SEQ ID NO: 29, and the CDR3 of the light chain variable region comprises an amino acid sequence set forth in SEQ ID NO: 33.

4. The composition of claim 1, wherein the antibody or antibody fragment thereof comprises a light chain variable region comprising an amino acid sequence of SEQ ID NO: 21 and a heavy chain variable region comprising an amino acid sequence of SEQ ID NO: 5.

5. The composition of claim 1, wherein the antibody or antibody fragment thereof comprises the amino acid sequence of SEQ ID NO: 3.

6. The composition of claim 1, wherein the antibody or antibody fragment thereof comprises:
   a) a heavy chain signal peptide comprising an amino acid sequence selected from the group consisting of the amino acid sequence of SEQ ID NO: 39, and an amino acid sequence having greater than about 90% homology to SEQ ID NO: 39;
   b) a heavy chain variable region comprising an amino acid sequence selected from the group consisting of the amino acid sequence of SEQ ID NO: 5, and an amino acid sequence having greater than about 90% homology to SEQ ID NO: 5;
   c) a light chain signal peptide comprising an amino acid sequence selected from the group consisting of the amino acid sequence of SEQ ID NO: 43, and an amino acid sequence having greater than about 90% homology to SEQ ID NO: 43; and
   d) a light chain variable region comprising an amino acid sequence selected from the group consisting of the amino acid sequence of SEQ ID NO: 21, and an amino acid sequence having greater than about 90% homology to SEQ ID NO: 21.

7. The composition of claim 1, wherein said antibody or antibody fragment thereof is selected from the group consisting of IgG1, IgG2, IgG3, IgG4, IgM, IgA1, IgA2, IgAsec, IgD, IgE or has immunoglobulin constant and/or variable domain of IgG1, IgG2, IgG3, IgG4, IgM, IgA1, IgA2, IgAsec, IgA or IgE.

8. The composition of claim 1, wherein said antibody or antigen-binding fragment comprises a part or a full light chain constant region of lambda, kappa or a variant thereof.

9. The composition of claim 1, wherein the antibody or antibody fragment thereof is a recombinant antibody.

10. The composition of claim 1, wherein the antibody or antibody fragment thereof is a monoclonal antibody, a polyclonal antibody, or a mixture of monoclonal and polyclonal antibodies.

11. The composition of claim 1, wherein the antibody or antibody fragment thereof is a human antibody, a humanized antibody, or a chimeric antibody.

12. A composition comprising an isolated nucleic acid molecule encoding an antibody or antibody fragment thereof of claim 1.

13. The composition of claim 12, wherein the composition is a vector comprising the isolated nucleic acid molecule.

14. The composition of claim 13, wherein the vector is selected from the group consisting of a DNA, a RNA, a plasmid, a lentivirus vector, adenoviral vector, or a retrovirus vector.

15. The composition of claim 1, wherein the composition is a cell comprising the antibody or antibody fragment thereof.

16. The composition of claim 12, wherein the composition is a cell comprising the isolated nucleic acid molecule.

17. The composition of claim 15, wherein the cell is a phage, an *E. coli*, a yeast cell, an insect cell or a mammalian cell such as CHO, HEK293, or PER.C6.

18. The composition of claim 15, wherein the cell is an in vitro or in vivo expression system, such as an engineered animal for protein expression.

19. The composition of claim 1, wherein the composition is an antibody drug conjugate comprising the antibody or antibody fragment thereof operably linked, covalently or non-covalently, to a biologically active agent, wherein said agent is a toxin, a radioisotope, a nanoparticle, an enzyme, a bio-active peptide or nucleotide.

20. The composition of claim 1, wherein the composition comprises a multiple specific antibody that binds two or more different epitopes on the same or different antigens, wherein one of the epitopes is on CD38.

21. The composition of claim 20, wherein the multiple specific antibody is a bispecific antibody.

22. A method of treating a subject having a disease associated with expression of CD38 comprising administering to the subject an effective amount of a composition of claim 1.

23. The composition of claim 1, further comprising a pharmaceutically acceptable carrier, excipient, stabilizer, diluent, adjuvants, cytokines, chemokines, chemotherapy drug, other therapeutic drug or a combination thereof.

24. A method of imaging a disease associated with the expression of CD38 in a subject, the method comprising the step of applying the composition of claim 1, wherein the antibody or antibody fragment thereof is operably linked to a reagent.

25. The method of claim 24, wherein the reagent is a photoactivatable agent, a fluorophore, a radioisotope, a bioluminescent protein, a bioluminescent peptide, a fluorescent tag, a fluorescent protein, a fluorescent peptide, a imaging contrast, an enzyme, a nuclear magnetic resonance active reagent, or a nanoparticle.

26. The method of claim 22, wherein the disease associated with CD38 expression is selected from a proliferative disease such as a cancer or malignancy or a precancerous condition, or autoimmune diseases, such as RA, SLE, SSc, MS, or a non-cancer or autoimmune disease related indication associated with expression of CD38.

\* \* \* \* \*

SEQUENCE LISTING

<160> NUMBER OF SEQ ID NOS: 43

<210> SEQ ID NO 1
<211> LENGTH: 300
<212> TYPE: PRT
<213> ORGANISM: Homo sapiens

<400> SEQUENCE: 1

Met Ala Asn Cys Glu Phe Ser Pro Val Ser Gly Asp Lys Pro Cys Cys
1               5                   10                  15

Arg Leu Ser Arg Arg Ala Gln Leu Cys Leu Gly Val Ser Ile Leu Val
                20                  25                  30

Leu Ile Leu Val Val Val Leu Ala Val Val Val Pro Arg Trp Arg Gln
            35                  40                  45

Gln Trp Ser Gly Pro Gly Thr Thr Lys Arg Phe Pro Glu Thr Val Leu
        50                  55                  60

Ala Arg Cys Val Lys Tyr Thr Glu Ile His Pro Glu Met Arg His Val
65                  70                  75                  80

Asp Cys Gln Ser Val Trp Asp Ala Phe Lys Gly Ala Phe Ile Ser Lys
                85                  90                  95

His Pro Cys Asn Ile Thr Glu Glu Asp Tyr Gln Pro Leu Met Lys Leu
                100                 105                 110

Gly Thr Gln Thr Val Pro Cys Asn Lys Ile Leu Leu Trp Ser Arg Ile
            115                 120                 125

Lys Asp Leu Ala His Gln Phe Thr Gln Val Gln Arg Asp Met Phe Thr
        130                 135                 140

Leu Glu Asp Thr Leu Leu Gly Tyr Leu Ala Asp Asp Leu Thr Trp Cys
145                 150                 155                 160

Gly Glu Phe Asn Thr Ser Lys Ile Asn Tyr Gln Ser Cys Pro Asp Trp
            165                 170                 175

Arg Lys Asp Cys Ser Asn Asn Pro Val Ser Val Phe Trp Lys Thr Val
        180                 185                 190

Ser Arg Arg Phe Ala Glu Ala Ala Cys Asp Val Val His Val Met Leu
    195                 200                 205

Asn Gly Ser Arg Ser Lys Ile Phe Asp Lys Asn Ser Thr Phe Gly Ser
210                 215                 220

Val Glu Val His Asn Leu Gln Pro Glu Lys Val Gln Thr Leu Glu Ala
225                 230                 235                 240

Trp Val Ile His Gly Gly Arg Glu Asp Ser Arg Asp Leu Cys Gln Asp
                245                 250                 255

Pro Thr Ile Lys Glu Leu Glu Ser Ile Ile Ser Lys Arg Asn Ile Gln
            260                 265                 270

Phe Ser Cys Lys Asn Ile Tyr Arg Pro Asp Lys Phe Leu Gln Cys Val
        275                 280                 285

Lys Asn Pro Glu Asp Ser Ser Cys Thr Ser Glu Ile
    290                 295                 300

<210> SEQ ID NO 2
<211> LENGTH: 780
<212> TYPE: DNA
<213> ORGANISM: Artificial Sequence
<220> FEATURE:
<223> OTHER INFORMATION: scFv418 nucleic acid sequence

<400> SEQUENCE: 2

```
caatctgccc tgactcagcc tgcctccgtg tctgggtctc ctggacagtc gatcaccatc      60
tcctgcactg gaaccagcag tgacgttggt ggttataact atgtctcctg gtaccaacag     120
cacccaggca agcccccaa actcgtaatt tatgagggca ctcagcggcc ctcaggggtt      180
tctagtcgct tctctggctc caagtctggc aacacggcct ccctgacaat ctctgggctc     240
caggctgagg acgaggctga ttattactgc agctcataca caagcagcag ttttatgtc     300
ttcggaactg ggaccaagct gaccgtccta gtcgacggtg aggtggcag tggaggtggc     360
ggttctggcg gtggaggttc tgctagccag gtacagctgc agcagtcagg tccaggactg     420
gtgaagccct cgcagaccct ctcactcacc tgtgccatct ccggggggcag tgtctctagc    480
aacagtgctg cttggaactg gatcaggcag tccccatcga gaggccttga gtggctggga    540
aggacatact acaggtccaa gtggtataat gattatgcag tatctgtgaa aagtcgaata    600
accatcaacc cagacacatc caagaaccag ttctccctgc agctgaactc tgtgactccc    660
gaggacacgg ctgtgtatta ctgtgcaaga gatgcgctag cagcagctgg tacatatggt    720
tactactact actacggtat ggacgtctgg ggccaaggga caatggtcac cgtctcttca    780
```

<210> SEQ ID NO 3
<211> LENGTH: 260
<212> TYPE: PRT
<213> ORGANISM: Artificial Sequence
<220> FEATURE:
<223> OTHER INFORMATION: scFv418 amino acid sequence

<400> SEQUENCE: 3

Gln Ser Ala Leu Thr Gln Pro Ala Ser Val Ser Gly Ser Pro Gly Gln
1               5                   10                  15

Ser Ile Thr Ile Ser Cys Thr Gly Thr Ser Ser Asp Val Gly Gly Tyr
            20                  25                  30

Asn Tyr Val Ser Trp Tyr Gln Gln His Pro Gly Lys Ala Pro Lys Leu
            35                  40                  45

Val Ile Tyr Glu Gly Thr Gln Arg Pro Ser Gly Val Ser Ser Arg Phe
 50                  55                  60

Ser Gly Ser Lys Ser Gly Asn Thr Ala Ser Leu Thr Ile Ser Gly Leu
 65                  70                  75                  80

Gln Ala Glu Asp Glu Ala Asp Tyr Tyr Cys Ser Ser Tyr Thr Ser Ser
                 85                  90                  95

Ser Phe Tyr Val Phe Gly Thr Gly Thr Lys Leu Thr Val Leu Val Asp
                100                 105                 110

Gly Gly Gly Gly Ser Gly Gly Gly Ser Gly Gly Gly Ser Ala
                115                 120                 125

Ser Gln Val Gln Leu Gln Gln Ser Gly Pro Gly Leu Val Lys Pro Ser
    130                 135                 140

Gln Thr Leu Ser Leu Thr Cys Ala Ile Ser Gly Gly Ser Val Ser Ser
145                 150                 155                 160

Asn Ser Ala Ala Trp Asn Trp Ile Arg Gln Ser Pro Ser Arg Gly Leu
                165                 170                 175

Glu Trp Leu Gly Arg Thr Tyr Tyr Arg Ser Lys Trp Tyr Asn Asp Tyr
            180                 185                 190

Ala Val Ser Val Lys Ser Arg Ile Thr Ile Asn Pro Asp Thr Ser Lys
            195                 200                 205

Asn Gln Phe Ser Leu Gln Leu Asn Ser Val Thr Pro Glu Asp Thr Ala
        210                 215                 220

Val Tyr Tyr Cys Ala Arg Asp Ala Leu Ala Ala Gly Thr Tyr Gly
225                 230                 235                 240

Tyr Tyr Tyr Tyr Tyr Gly Met Asp Val Trp Gly Gln Gly Thr Met Val
                245                 250                 255

Thr Val Ser Ser
            260

<210> SEQ ID NO 4
<211> LENGTH: 393
<212> TYPE: DNA
<213> ORGANISM: Artificial Sequence
<220> FEATURE:
<223> OTHER INFORMATION: scFv418 VH nucleic acid sequence

<400> SEQUENCE: 4
caggtacagc tgcagcagtc aggtccagga ctggtgaagc cctcgcagac cctctcactc      60
acctgtgcca tctccggggg cagtgtctct agcaacagtg ctgcttggaa ctggatcagg     120
cagtccccat cgagaggcct tgagtggctg gaaggacat actacaggtc caagtggtat      180
aatgattatg cagtatctgt gaaaagtcga ataaccatca cccagacac atccaagaac      240 cagttctccc tgcagctgaa ctctgtgact cccgaggaca cggctgtgta ttactgtgca     300
agagatgcgc tagcagcagc tggtacatat ggttactact actactacgg tatggacgtc     360
tggggccaag ggacaatggt caccgtctct tca                                  393

<210> SEQ ID NO 5
<211> LENGTH: 131
<212> TYPE: PRT
<213> ORGANISM: Artificial Sequence
<220> FEATURE:
<223> OTHER INFORMATION: scFv418 VH amino acid sequence

<400> SEQUENCE: 5

```
Gln Val Gln Leu Gln Gln Ser Gly Pro Gly Leu Val Lys Pro Ser Gln
1               5                   10                  15

Thr Leu Ser Leu Thr Cys Ala Ile Ser Gly Gly Ser Val Ser Ser Asn
            20                  25                  30

Ser Ala Ala Trp Asn Trp Ile Arg Gln Ser Pro Ser Arg Gly Leu Glu
            35                  40                  45

Trp Leu Gly Arg Thr Tyr Tyr Arg Ser Lys Trp Tyr Asn Asp Tyr Ala
        50                  55                  60

Val Ser Val Lys Ser Arg Ile Thr Ile Asn Pro Asp Thr Ser Lys Asn
65                  70                  75                  80

Gln Phe Ser Leu Gln Leu Asn Ser Val Thr Pro Glu Asp Thr Ala Val
                85                  90                  95

Tyr Tyr Cys Ala Arg Asp Ala Leu Ala Ala Gly Thr Tyr Gly Tyr
            100                 105                 110

Tyr Tyr Tyr Tyr Gly Met Asp Val Trp Gly Gln Gly Thr Met Val Thr
            115                 120                 125

Val Ser Ser
    130
```

<210> SEQ ID NO 6
<211> LENGTH: 75
<212> TYPE: DNA
<213> ORGANISM: Artificial Sequence
<220> FEATURE:
<223> OTHER INFORMATION: scFv418 VH frame region 1 (FR1) nucleic acid
      sequence

<400> SEQUENCE: 6
caggtacagc tgcagcagtc aggtccagga ctggtgaagc cctcgcagac cctctcactc    60
acctgtgcca tctcc                                                    75

<210> SEQ ID NO 7
<211> LENGTH: 25
<212> TYPE: PRT
<213> ORGANISM: Artificial Sequence
<220> FEATURE:
<223> OTHER INFORMATION: scFv418 VH frame region 1 (FR1) amino acid
      sequence

<400> SEQUENCE: 7

```
Gln Val Gln Leu Gln Gln Ser Gly Pro Gly Leu Val Lys Pro Ser Gln
1               5                   10                  15

Thr Leu Ser Leu Thr Cys Ala Ile Ser
            20                  25
```

<210> SEQ ID NO 8
<211> LENGTH: 30
<212> TYPE: DNA
<213> ORGANISM: Artificial Sequence
<220> FEATURE:
<223> OTHER INFORMATION: scFv418 VH CDR1 nucleic acid sequence

<400> SEQUENCE: 8
gggggcagtg tctctagcaa cagtgctgct                                    30

<210> SEQ ID NO 9
<211> LENGTH: 10
<212> TYPE: PRT
<213> ORGANISM: Artificial Sequence
<220> FEATURE:
<223> OTHER INFORMATION: scFv418 VH CDR1 amino acid sequence

<400> SEQUENCE: 9

Gly Gly Ser Val Ser Ser Asn Ser Ala Ala
1               5                   10

<210> SEQ ID NO 10
<211> LENGTH: 51
<212> TYPE: DNA
<213> ORGANISM: Artificial Sequence
<220> FEATURE:
<223> OTHER INFORMATION: scFv418 VH frame region 2 (FR2) nucleic acid
      sequence

<400> SEQUENCE: 10
tggaactgga tcaggcagtc cccatcgaga ggccttgagt ggctgggaag g             51

<210> SEQ ID NO 11
<211> LENGTH: 17
<212> TYPE: PRT
<213> ORGANISM: Artificial Sequence
<220> FEATURE:
<223> OTHER INFORMATION: scFv418 VH frame region 2 (FR2) amino acid
      sequence

<400> SEQUENCE: 11

Trp Asn Trp Ile Arg Gln Ser Pro Ser Arg Gly Leu Glu Trp Leu Gly
1               5                   10                  15
Arg

<210> SEQ ID NO 12
<211> LENGTH: 27
<212> TYPE: DNA
<213> ORGANISM: Artificial Sequence
<220> FEATURE:
<223> OTHER INFORMATION: scFv418 VH CDR2 nucleic acid sequence

<400> SEQUENCE: 12
acatactaca ggtccaagtg gtataat                                        27

<210> SEQ ID NO 13
<211> LENGTH: 9
<212> TYPE: PRT
<213> ORGANISM: Artificial Sequence
<220> FEATURE:
<223> OTHER INFORMATION: scFv418 VH CDR2 amino acid sequence

<400> SEQUENCE: 13

Thr Tyr Tyr Arg Ser Lys Trp Tyr Asn
1               5

<210> SEQ ID NO 14
<211> LENGTH: 114
<212> TYPE: DNA
<213> ORGANISM: Artificial Sequence
<220> FEATURE:
<223> OTHER INFORMATION: scFv418 VH frame region 3 (FR3) nucleic acid
      sequence

<400> SEQUENCE: 14
gattatgcag tatctgtgaa aagtcgaata accatcaacc agacacatc caagaaccag     60
ttctccctgc agctgaactc tgtgactccc gaggacacgg ctgtgtatta ctgt          114

<210> SEQ ID NO 15
<211> LENGTH: 38
<212> TYPE: PRT

<213> ORGANISM: Artificial Sequence
<220> FEATURE:
<223> OTHER INFORMATION: scFv418 VH frame region 3 (FR3) amino acid
      sequence

<400> SEQUENCE: 15

Asp Tyr Ala Val Ser Val Lys Ser Arg Ile Thr Ile Asn Pro Asp Thr
1               5                   10                  15

Ser Lys Asn Gln Phe Ser Leu Gln Leu Asn Ser Val Thr Pro Glu Asp
            20                  25                  30

Thr Ala Val Tyr Tyr Cys
            35

<210> SEQ ID NO 16
<211> LENGTH: 63
<212> TYPE: DNA
<213> ORGANISM: Artificial Sequence
<220> FEATURE:
<223> OTHER INFORMATION: scFv418 VH CDR3 nucleic acid sequence

<400> SEQUENCE: 16
gcaagagatg cgctagcagc agctggtaca tatggttact actactacta cggtatggac       60
gtc                                                                    63

<210> SEQ ID NO 17
<211> LENGTH: 21
<212> TYPE: PRT
<213> ORGANISM: Artificial Sequence
<220> FEATURE:
<223> OTHER INFORMATION: scFv418 VH CDR3 amino acid sequence

<400> SEQUENCE: 17

Ala Arg Asp Ala Leu Ala Ala Ala Gly Thr Tyr Gly Tyr Tyr Tyr Tyr
1               5                   10                  15

Tyr Gly Met Asp Val
            20

<210> SEQ ID NO 18
<211> LENGTH: 33
<212> TYPE: DNA
<213> ORGANISM: Artificial Sequence
<220> FEATURE:
<223> OTHER INFORMATION: scFv418 VH frame region 4 (FR4) nucleic acid
      sequence

<400> SEQUENCE: 18
tggggccaag ggacaatggt caccgtctct tca                                   33

<210> SEQ ID NO 19
<211> LENGTH: 11
<212> TYPE: PRT
<213> ORGANISM: Artificial Sequence
<220> FEATURE:
<223> OTHER INFORMATION: scFv418 VH frame region 4 (FR4) amino acid
      sequence

<400> SEQUENCE: 19

Trp Gly Gln Gly Thr Met Val Thr Val Ser Ser
1               5                   10

<210> SEQ ID NO 20
<211> LENGTH: 330
<212> TYPE: DNA
<213> ORGANISM: Artificial Sequence
<220> FEATURE:

<223> OTHER INFORMATION: scFv418 VL nucleic acid sequence

<400> SEQUENCE: 20

```
caatctgccc tgactcagcc tgcctccgtg tctgggtctc ctggacagtc gatcaccatc    60
tcctgcactg gaaccagcag tgacgttggt ggttataact atgtctcctg gtaccaacag   120
cacccaggca aagcccccaa actcgtaatt tatgagggca ctcagcggcc ctcaggggtt   180
tctagtcgct tctctggctc caagtctggc aacacggcct ccctgacaat ctctgggctc   240
caggctgagg acgaggctga ttattactgc agctcataca caagcagcag ttttatgtc   300
ttcggaactg ggaccaagct gaccgtccta                                     330
```

<210> SEQ ID NO 21
<211> LENGTH: 110
<212> TYPE: PRT
<213> ORGANISM: Artificial Sequence
<220> FEATURE:
<223> OTHER INFORMATION: scFv418 VL amino acid sequence

<400> SEQUENCE: 21

```
Gln Ser Ala Leu Thr Gln Pro Ala Ser Val Ser Gly Ser Pro Gly Gln
1               5                   10                  15

Ser Ile Thr Ile Ser Cys Thr Gly Thr Ser Ser Asp Val Gly Gly Tyr
                20                  25                  30

Asn Tyr Val Ser Trp Tyr Gln Gln His Pro Gly Lys Ala Pro Lys Leu
            35                  40                  45

Val Ile Tyr Glu Gly Thr Gln Arg Pro Ser Gly Val Ser Ser Arg Phe
        50                  55                  60

Ser Gly Ser Lys Ser Gly Asn Thr Ala Ser Leu Thr Ile Ser Gly Leu
65                  70                  75                  80

Gln Ala Glu Asp Glu Ala Asp Tyr Tyr Cys Ser Ser Tyr Thr Ser Ser
                85                  90                  95

Ser Phe Tyr Val Phe Gly Thr Gly Thr Lys Leu Thr Val Leu
            100                 105                 110
```

<210> SEQ ID NO 22
<211> LENGTH: 75
<212> TYPE: DNA
<213> ORGANISM: Artificial Sequence
<220> FEATURE:
<223> OTHER INFORMATION: scFv418 VL frame region (FR1) nucleic acid
       sequence

<400> SEQUENCE: 22

```
caatctgccc tgactcagcc tgcctccgtg tctgggtctc ctggacagtc gatcaccatc    60
tcctgcactg gaacc                                                     75
```

<210> SEQ ID NO 23
<211> LENGTH: 25
<212> TYPE: PRT
<213> ORGANISM: Artificial Sequence
<220> FEATURE:
<223> OTHER INFORMATION: scFv418 VL frame region (FR1) amino acid
       sequence

<400> SEQUENCE: 23

```
Gln Ser Ala Leu Thr Gln Pro Ala Ser Val Ser Gly Ser Pro Gly Gln
1               5                   10                  15

Ser Ile Thr Ile Ser Cys Thr Gly Thr
                20                  25
```

```
<210> SEQ ID NO 24
<211> LENGTH: 27
<212> TYPE: DNA
<213> ORGANISM: Artificial Sequence
<220> FEATURE:
<223> OTHER INFORMATION: scFv418 VL CDR1 nucleic acid sequence

<400> SEQUENCE: 24
agcagtgacg ttggtggtta taactat                                        27

<210> SEQ ID NO 25
<211> LENGTH: 9
<212> TYPE: PRT
<213> ORGANISM: Artificial Sequence
<220> FEATURE:
<223> OTHER INFORMATION: scFv418 VL CDR1 amino acid sequence

<400> SEQUENCE: 25

Ser Ser Asp Val Gly Gly Tyr Asn Tyr
1               5

<210> SEQ ID NO 26
<211> LENGTH: 51
<212> TYPE: DNA
<213> ORGANISM: Artificial Sequence
<220> FEATURE:
<223> OTHER INFORMATION: scFv418 VL frame region 2 (FR2) nucleic acid
      sequence

<400> SEQUENCE: 26
gtctcctggt accaacagca cccaggcaaa gcccccaaac tcgtaattta t              51

<210> SEQ ID NO 27
<211> LENGTH: 17
<212> TYPE: PRT
<213> ORGANISM: Artificial Sequence
<220> FEATURE:
<223> OTHER INFORMATION: scFv418 VL frame region 2 (FR2) amino acid
      sequence

<400> SEQUENCE: 27

Val Ser Trp Tyr Gln Gln His Pro Gly Lys Ala Pro Lys Leu Val Ile
1               5                   10                  15

Tyr

<210> SEQ ID NO 28
<211> LENGTH: 9
<212> TYPE: DNA
<213> ORGANISM: Artificial Sequence
<220> FEATURE:
<223> OTHER INFORMATION: scFv418 VL CDR2 nucleic acid sequence

<400> SEQUENCE: 28 gagggcact                                                            9

<210> SEQ ID NO 29
<211> LENGTH: 3
<212> TYPE: PRT
<213> ORGANISM: Artificial Sequence
<220> FEATURE:
<223> OTHER INFORMATION: scFv418 VL CDR2 amino acid sequence

<400> SEQUENCE: 29

Glu Gly Thr
1
```

<210> SEQ ID NO 30
<211> LENGTH: 108
<212> TYPE: DNA
<213> ORGANISM: Artificial Sequence
<220> FEATURE:
<223> OTHER INFORMATION: scFv418 VL frame region 3 (FR3) nucleic acid
      sequence

<400> SEQUENCE: 30
cagcggccct cagggtttc tagtcgcttc tctggctcca agtctggcaa cacggcctcc    60
ctgacaatct ctgggctcca ggctgaggac gaggctgatt attactgc                108

<210> SEQ ID NO 31
<211> LENGTH: 36
<212> TYPE: PRT
<213> ORGANISM: Artificial Sequence
<220> FEATURE:
<223> OTHER INFORMATION: scFv418 VL frame region 3 (FR3) amino acid
      sequence

<400> SEQUENCE: 31

Gln Arg Pro Ser Gly Val Ser Ser Arg Phe Ser Gly Ser Lys Ser Gly
1               5                   10                  15

Asn Thr Ala Ser Leu Thr Ile Ser Gly Leu Gln Ala Glu Asp Glu Ala
                20                  25                  30

Asp Tyr Tyr Cys
        35

<210> SEQ ID NO 32
<211> LENGTH: 30
<212> TYPE: DNA
<213> ORGANISM: Artificial Sequence
<220> FEATURE:
<223> OTHER INFORMATION: scFv418 VL CDR3 nucleic acid sequence

<400> SEQUENCE: 32
agctcataca caagcagcag tttttatgtc                                    30

<210> SEQ ID NO 33
<211> LENGTH: 10
<212> TYPE: PRT
<213> ORGANISM: Artificial Sequence
<220> FEATURE:
<223> OTHER INFORMATION: scFv418 VL CDR3 amino acid sequence

<400> SEQUENCE: 33

Ser Ser Tyr Thr Ser Ser Ser Phe Tyr Val
1               5                   10

<210> SEQ ID NO 34
<211> LENGTH: 30
<212> TYPE: DNA
<213> ORGANISM: Artificial Sequence
<220> FEATURE:
<223> OTHER INFORMATION: scFv418 VL frame region 4 (FR4) nucleic acid
      sequence

<400> SEQUENCE: 34
ttcggaactg ggaccaagct gaccgtccta                                    30

<210> SEQ ID NO 35
<211> LENGTH: 10
<212> TYPE: PRT
<213> ORGANISM: Artificial Sequence
<220> FEATURE:

<223> OTHER INFORMATION: scFv418 VL frame region 4 (FR4) amino acid
      sequence

<400> SEQUENCE: 35

Phe Gly Thr Gly Thr Lys Leu Thr Val Leu
1               5                   10

<210> SEQ ID NO 36
<211> LENGTH: 1386
<212> TYPE: DNA
<213> ORGANISM: Artificial Sequence
<220> FEATURE:
<223> OTHER INFORMATION: IgG418 heavy chain nucleic acid sequence

<400> SEQUENCE: 36

```
caggtacagc tgcagcagtc aggtccagga ctggtgaagc cctcgcagac cctctcactc      60
acctgtgcca tctccggggg cagtgtctct agcaacagtg ctgcttggaa ctggatcagg     120
cagtccccat cgagaggcct tgagtggctg ggaaggacat actacaggtc caagtggtat     180
aatgattatg cagtatctgt gaaaagtcga ataaccatca cccagacac atccaagaac     240
cagttctccc tgcagctgaa ctctgtgact cccgaggaca cggctgtgta ttactgtgca     300
agagatgcgc tagcagcagc tggtacatat ggttactact actactacgg tatggacgtc     360
tggggccaag gacaatggt caccgtctct tcagcctcca ctaagggccc atccgtgttc      420
ccactggcac cctctagtaa gagcacatct ggggggtactg ccgctctggg atgtctggtg    480
aaggattact cccagagcc agtcaccgtg tcctggaaca gcggggccct gacttccggt      540
gtccatacct tccagctgt gctgcagtca tccggcctgt acagcctgag ctctgtggtc      600
accgtcccca gttcatccct gggaacacag acttatatct gcaacgtgaa tcacaagcca    660
tccaatacaa aagtcgacaa gaaagtgaa cccaagagct gtgataaaac ccatacatgc     720
ccccttgtc ctgctccaga gctgctggga ggaccatccg tgttcctgtt ccacccaag      780
cctaaagaca ctctgatgat ttctcgaacc cccgaagtca catgcgtggt cgtggacgtg    840
tcccacgagg atcctgaagt caagttcaac tggtacgtgg atggcgtcga ggtgcataat    900
gccaagacaa aaccacgaga ggaacagtac aacagtacct atcgtgtcgt gtcagtcctg     960
acagtgctgc accaggactg gctgaacggg aaggaatata agtgcaaagt gagcaataag   1020
gcactgcccg ccctatcga aaaacaatt tctaaggcta aaggacagcc tagggaacca    1080
caggtgtaca ctctgcctcc atcacgggac gagctgacaa agaaccaggt cagtctgact   1140
tgtctggtga aagggttcta tccttctgat atcgccgtgg agtgggaaag taatggtcag   1200
ccagagaaca attacaagac cacccccct gtcctggact ctgatgggag tttctttctg    1260
tattccaagc tgaccgtgga taaaagccgg tggcagcagg gtaatgtctt tagttgttca   1320
gtgatgcacg aggcactgca caatcactac acccagaaat cactgtcact gtcaccaggt   1380
aaatga                                                              1386
```

<210> SEQ ID NO 37
<211> LENGTH: 461
<212> TYPE: PRT
<213> ORGANISM: Artificial Sequence
<220> FEATURE:
<223> OTHER INFORMATION: IgG418 heavy chain amino acid sequence

<400> SEQUENCE: 37

Gln Val Gln Leu Gln Gln Ser Gly Pro Gly Leu Val Lys Pro Ser Gln
1               5                   10                  15

-continued

```
Thr Leu Ser Leu Thr Cys Ala Ile Ser Gly Gly Ser Val Ser Ser Asn
             20                  25                  30
Ser Ala Ala Trp Asn Trp Ile Arg Gln Ser Pro Ser Arg Gly Leu Glu
         35                  40                  45
Trp Leu Gly Arg Thr Tyr Tyr Arg Ser Lys Trp Tyr Asn Asp Tyr Ala
     50                  55                  60
Val Ser Val Lys Ser Arg Ile Thr Ile Asn Pro Asp Thr Ser Lys Asn
65                  70                  75                  80
Gln Phe Ser Leu Gln Leu Asn Ser Val Thr Pro Glu Asp Thr Ala Val
                 85                  90                  95
Tyr Tyr Cys Ala Arg Asp Ala Leu Ala Ala Gly Thr Tyr Gly Tyr
            100                 105                 110
Tyr Tyr Tyr Tyr Gly Met Asp Val Trp Gly Gln Gly Thr Met Val Thr
        115                 120                 125
Val Ser Ser Ala Ser Thr Lys Gly Pro Ser Val Phe Pro Leu Ala Pro
    130                 135                 140
Ser Ser Lys Ser Thr Ser Gly Gly Thr Ala Ala Leu Gly Cys Leu Val
145                 150                 155                 160
Lys Asp Tyr Phe Pro Glu Pro Val Thr Val Ser Trp Asn Ser Gly Ala
                165                 170                 175
Leu Thr Ser Gly Val His Thr Phe Pro Ala Val Leu Gln Ser Ser Gly
            180                 185                 190
Leu Tyr Ser Leu Ser Ser Val Val Thr Val Pro Ser Ser Ser Leu Gly
        195                 200                 205
Thr Gln Thr Tyr Ile Cys Asn Val Asn His Lys Pro Ser Asn Thr Lys
    210                 215                 220
Val Asp Lys Lys Val Glu Pro Lys Ser Cys Asp Lys Thr His Thr Cys
225                 230                 235                 240
Pro Pro Cys Pro Ala Pro Glu Leu Leu Gly Gly Pro Ser Val Phe Leu
                245                 250                 255
Phe Pro Pro Lys Pro Lys Asp Thr Leu Met Ile Ser Arg Thr Pro Glu
            260                 265                 270
Val Thr Cys Val Val Val Asp Val Ser His Glu Asp Pro Glu Val Lys
        275                 280                 285
Phe Asn Trp Tyr Val Asp Gly Val Glu Val His Asn Ala Lys Thr Lys
    290                 295                 300
Pro Arg Glu Glu Gln Tyr Asn Ser Thr Tyr Arg Val Val Ser Val Leu
305                 310                 315                 320
Thr Val Leu His Gln Asp Trp Leu Asn Gly Lys Glu Tyr Lys Cys Lys
                325                 330                 335
Val Ser Asn Lys Ala Leu Pro Ala Pro Ile Glu Lys Thr Ile Ser Lys
            340                 345                 350
Ala Lys Gly Gln Pro Arg Glu Pro Gln Val Tyr Thr Leu Pro Pro Ser
        355                 360                 365
Arg Asp Glu Leu Thr Lys Asn Gln Val Ser Leu Thr Cys Leu Val Lys
    370                 375                 380
Gly Phe Tyr Pro Ser Asp Ile Ala Val Glu Trp Glu Ser Asn Gly Gln
385                 390                 395                 400
Pro Glu Asn Asn Tyr Lys Thr Thr Pro Pro Val Leu Asp Ser Asp Gly
                405                 410                 415
Ser Phe Phe Leu Tyr Ser Lys Leu Thr Val Asp Lys Ser Arg Trp Gln
            420                 425                 430
Gln Gly Asn Val Phe Ser Cys Ser Val Met His Glu Ala Leu His Asn
```

His Tyr Thr Gln Lys Ser Leu Ser Leu Ser Pro Gly Lys
    450                 455                 460

<210> SEQ ID NO 38
<211> LENGTH: 60
<212> TYPE: DNA
<213> ORGANISM: Artificial Sequence
<220> FEATURE:
<223> OTHER INFORMATION: IgG418 heavy chain signal peptide nucleic acid
      sequence

<400> SEQUENCE: 38
atgtctgtct ccttcctcat cttcctgccc gtgctgggcc tcccatgggg tgtcctgtca    60

<210> SEQ ID NO 39
<211> LENGTH: 20
<212> TYPE: PRT
<213> ORGANISM: Artificial Sequence
<220> FEATURE:
<223> OTHER INFORMATION: IgG418 heavy chain signal peptide amino acid
      sequence

<400> SEQUENCE: 39

Met Ser Val Ser Phe Leu Ile Phe Leu Pro Val Leu Gly Leu Pro Trp
1               5                   10                  15

Gly Val Leu Ser
            20

<210> SEQ ID NO 40
<211> LENGTH: 651
<212> TYPE: DNA
<213> ORGANISM: Artificial Sequence
<220> FEATURE:
<223> OTHER INFORMATION: IgG418 light chain nucleic acid sequence

<400> SEQUENCE: 40
caatctgccc tgactcagcc tgcctccgtg tctgggtctc ctggacagtc gatcaccatc      60
tcctgcactg gaaccagcag tgacgttggt ggttataact atgtctcctg gtaccaacag    120
cacccaggca aagcccccaa actcgtaatt tatgagggca ctcagcggcc ctcaggggtt    180
tctagtcgct tctctggctc caagtctggc aacacggcct ccctgacaat ctctgggctc    240
caggctgagg acgaggctga ttattactgc agctcataca caagcagcag ttttatgtc    300 ttcggaactg ggaccaagct gaccgtccta ggtcagccta aggctgctcc tagcgtgacc    360
ctgttccctc ccagcagcga ggagctgcag gcaaacaaag ccaccctggt gtgcctgatc    420
tccgactttt accctggcgc cgtgacagtg gcctggaagg ctgacagcag cccagtgaaa    480
gccggagtgg agaccaccac ccctccaag cagtccaaca caagtacgc cgcatcctcc    540 tacctgagcc tgaccccga gcagtggaag tcccacaggt cctactcctg ccaggtgacc    600
cacgagggct ctaccgtgga aaagaccgtg gccccaccg agtgctcctg a              651

<210> SEQ ID NO 41
<211> LENGTH: 216
<212> TYPE: PRT
<213> ORGANISM: Artificial Sequence
<220> FEATURE:
<223> OTHER INFORMATION: IgG418 light chain amino acid sequence

<400> SEQUENCE: 41

Gln Ser Ala Leu Thr Gln Pro Ala Ser Val Ser Gly Ser Pro Gly Gln
1               5                   10                  15

```
Ser Ile Thr Ile Ser Cys Thr Gly Thr Ser Ser Asp Val Gly Gly Tyr
            20                  25                  30

Asn Tyr Val Ser Trp Tyr Gln Gln His Pro Gly Lys Ala Pro Lys Leu
        35                  40                  45

Val Ile Tyr Glu Gly Thr Gln Arg Pro Ser Gly Val Ser Ser Arg Phe
    50                  55                  60

Ser Gly Ser Lys Ser Gly Asn Thr Ala Ser Leu Thr Ile Ser Gly Leu
65                  70                  75                  80

Gln Ala Glu Asp Glu Ala Asp Tyr Tyr Cys Ser Ser Tyr Thr Ser Ser
                85                  90                  95

Ser Phe Tyr Val Phe Gly Thr Gly Thr Lys Leu Thr Val Leu Gly Gln
            100                 105                 110

Pro Lys Ala Ala Pro Ser Val Thr Leu Phe Pro Pro Ser Ser Glu Glu
        115                 120                 125

Leu Gln Ala Asn Lys Ala Thr Leu Val Cys Leu Ile Ser Asp Phe Tyr
    130                 135                 140

Pro Gly Ala Val Thr Val Ala Trp Lys Ala Asp Ser Ser Pro Val Lys
145                 150                 155                 160

Ala Gly Val Glu Thr Thr Thr Pro Ser Lys Gln Ser Asn Asn Lys Tyr
                165                 170                 175

Ala Ala Ser Ser Tyr Leu Ser Leu Thr Pro Glu Gln Trp Lys Ser His
            180                 185                 190

Arg Ser Tyr Ser Cys Gln Val Thr His Glu Gly Ser Thr Val Glu Lys
        195                 200                 205

Thr Val Ala Pro Thr Glu Cys Ser
    210                 215

<210> SEQ ID NO 42
<211> LENGTH: 57
<212> TYPE: DNA
<213> ORGANISM: Artificial Sequence
<220> FEATURE:
<223> OTHER INFORMATION: IgG418 light chain signal peptide nucleic acid
      sequence

<400> SEQUENCE: 42
atggcctggg ctctgctgct cctcaccctc ctcactcagg gcacagggtc ctgggcc          57

<210> SEQ ID NO 43
<211> LENGTH: 19
<212> TYPE: PRT
<213> ORGANISM: Artificial Sequence
<220> FEATURE:
<223> OTHER INFORMATION: IgG418 light chain signal peptide amino acid
      sequence

<400> SEQUENCE: 43

Met Ala Trp Ala Leu Leu Leu Leu Thr Leu Leu Thr Gln Gly Thr Gly
1               5                   10                  15

Ser Trp Ala
```